US009191782B2

(12) United States Patent
Chao et al.

(10) Patent No.: US 9,191,782 B2
(45) Date of Patent: Nov. 17, 2015

(54) 2D TO 3D MAP CONVERSION FOR IMPROVED NAVIGATION

(71) Applicant: QUALCOMM Incorporated, San Diego, CA (US)

(72) Inventors: Hui Chao, San Jose, CA (US); Jiajian Chen, San Jose, CA (US); Saumitra Mohan Das, Santa Clara, CA (US)

(73) Assignee: QUALCOMM Incorporated, San Diego, CA (US)

(*) Notice: Subject to any disclaimer, the term of this patent is extended or adjusted under 35 U.S.C. 154(b) by 116 days.

(21) Appl. No.: 13/796,947

(22) Filed: Mar. 12, 2013

(65) Prior Publication Data
US 2014/0274138 A1 Sep. 18, 2014

(51) Int. Cl.
H04W 24/00 (2009.01)
H04W 4/04 (2009.01)
G06T 19/00 (2011.01)
G06T 17/00 (2006.01)
G01C 21/20 (2006.01)
G06T 15/00 (2011.01)

(52) U.S. Cl.
CPC .............. H04W 4/043 (2013.01); G01C 21/206 (2013.01); G06T 17/00 (2013.01); G06T 19/003 (2013.01); G06T 2210/04 (2013.01); G06T 2210/62 (2013.01)

(58) Field of Classification Search
CPC ....... G06T 19/003; G06T 19/00; G06T 15/04; G06T 19/20; G06T 15/00; G06T 17/00; G06T 2210/04; G06T 2210/62; H04N 13/0275; H04N 43/045; G01C 21/206; H04W 4/043
USPC ........................................................ 455/456.3
See application file for complete search history.

(56) References Cited

U.S. PATENT DOCUMENTS

| 2010/0305849 | A1 | 12/2010 | Nirhamo | |
|---|---|---|---|---|
| 2011/0001751 | A1 | 1/2011 | Carlsson et al. | |
| 2011/0176179 | A1 | 7/2011 | Judelson | |
| 2012/0016578 | A1 | 1/2012 | Coppens | |
| 2012/0050479 | A1 | 3/2012 | Karaoguz et al. | |
| 2013/0104073 | A1* | 4/2013 | Bowditch et al. | 715/782 |
| 2014/0223360 | A1* | 8/2014 | Bailiang | 715/800 |
| 2014/0253538 | A1* | 9/2014 | Bailiang | 345/419 |

FOREIGN PATENT DOCUMENTS

KR 20060049572 A * 6/2006

* cited by examiner

Primary Examiner — Timothy Pham
(74) Attorney, Agent, or Firm — Hunter Clark PLLC

(57) ABSTRACT

Techniques for providing improved navigation through an indoor environment using a mobile device are provided. A method according to these techniques includes accessing a 2D map of the indoor environment, accessing customization information comprising one or more attributes to be applied to a 3D model of the indoor environment derived from the 2D map, analyzing the 2D map to extract geometry information associated with the layout of the indoor environment, generating the 3D model based on the geometry extracted from the 2D map and the customization information, generating a 3D representation of a current location of the mobile device within the indoor environment based on the 3D model; and displaying the 3D representation on a display of the mobile device.

96 Claims, 10 Drawing Sheets

Mobile Device

Mobile Device

Navigation Server

Location Server

Mobile Device

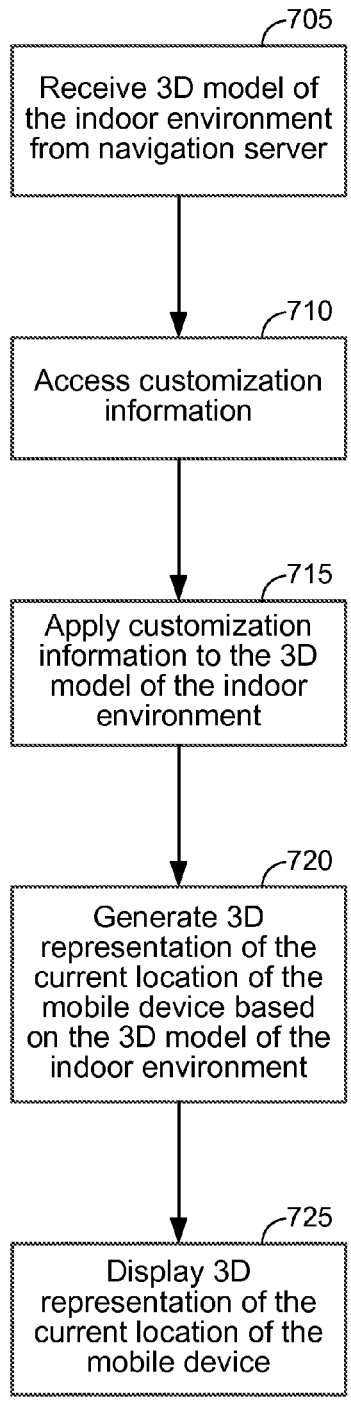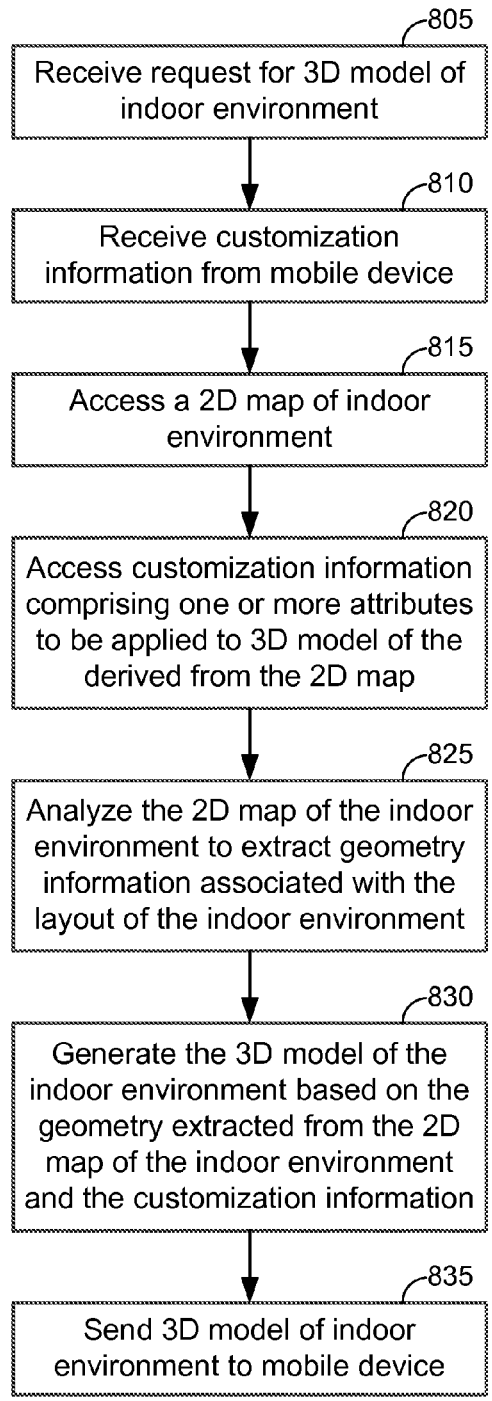
FIG. 7
Mobile Device
FIG. 8
Navigation Server

Mobile Device

Navigation Server

2D TO 3D MAP CONVERSION FOR IMPROVED NAVIGATION

BACKGROUND

A mobile device can be configured to obtain a 2D map of an indoor environment to facilitate navigation through the indoor environment. However, a 2D map of the indoor environment may not always be easy for a user of the mobile device to use to navigate through the indoor environment. The user may not be able easily translate what they are seeing on the 2D map to the 3D environment through which they are navigating.

SUMMARY

An example method for providing improved navigation through an indoor environment using a mobile device according to the disclosure includes accessing a two-dimensional (2D) map of the indoor environment, accessing customization information comprising one or more attributes to be applied to a three-dimensional (3D) model of the indoor environment derived from the 2D map of the indoor environment, analyzing the 2D map of the indoor environment to extract geometry information associated with the layout of the indoor environment, generating the 3D model of the indoor environment based on the geometry extracted from the 2D map of the indoor environment and the customization information, generating a 3D representation of a current location of the mobile device within the indoor environment based on the 3D model of the indoor environment, and displaying the 3D representation of the current location of the mobile device within the indoor environment on a display of the mobile device.

Implementations of such a method may include one or more of the following features. Displaying the 3D representation of the current location of the mobile device within the indoor environment on a display of the mobile device further includes displaying a field of view in the 3D representation of the current location of the mobile device based at least in part on the orientation of the mobile device. The customization information includes transparency parameters, and the transparency parameters define levels of transparency to be associated with objects included in the 3D representation of the current location of the mobile device. The customization information includes at least one of texture information and color information, and the texture information identifies one or more textures to be applied to objects included in the 3D representation and the color information identifying one or more colors to be applied to objects included in the 3D representation. The customization information includes route information, the route information identifying a route through the indoor environment, and generating a 3D representation of a current location of the mobile device within the indoor environment based on the 3D model of the indoor environment includes rendering portions of the 3D representation of the current location of the mobile device as partially transparent to emphasize the route through the indoor environment. The customization information includes a user profile associated with a user of the mobile device and security parameters associated with the indoor environment, and generating a 3D representation of a current location of the mobile device within the indoor environment based on the 3D model of the indoor environment comprises selectively rendering portions of the representation of the model as opaque based on the profile of the user and the security parameters associated with the indoor environment. Receiving the 2D map of the indoor environment from a location server associated with the mobile device. Receiving the 2D map of the indoor environment from a server associated with the indoor environment. Receiving the customization information at least in part from a server associated with the indoor environment. Receiving the customization information at least in part from a user of the mobile device.

An example apparatus for providing improved navigation through an indoor environment using a mobile device according to the disclosure includes means for accessing a two-dimensional (2D) map of the indoor environment, means for accessing customization information comprising one or more attributes to be applied to a three-dimensional (3D) model of the indoor environment derived from the 2D map of the indoor environment, means for analyzing the 2D map of the indoor environment to extract geometry information associated with the layout of the indoor environment, means for generating the 3D model of the indoor environment based on the geometry extracted from the 2D map of the indoor environment and the customization information, means for generating a 3D representation of a current location of the mobile device within the indoor environment based on the 3D model of the indoor environment, and means for displaying the 3D representation of the current location of the mobile device within the indoor environment on a display of the mobile device.

Implementations of such an apparatus may include one or more of the following features. The means for displaying the 3D representation of the current location of the mobile device within the indoor environment on a display of the mobile device include means for displaying a field of view in the 3D representation of the current location of the mobile device based at least in part on the orientation of the mobile device. The customization information includes transparency parameters, and the transparency parameters define levels of transparency to be associated with objects included in the 3D representation of the current location of the mobile device. The customization information includes at least one of texture information and color information, and the texture information identifies one or more textures to be applied to objects included in the 3D representation and the color information identifying one or more colors to be applied to objects included in the 3D representation. The customization information includes route information, the route information identifying a route through the indoor environment, and the means for generating a 3D representation of a current location of the mobile device within the indoor environment based on the 3D model of the indoor environment includes means for rendering portions of the 3D representation of the current location of the mobile device as partially transparent to emphasize the route through the indoor environment. The customization information includes a user profile associated with a user of the mobile device and security parameters associated with the indoor environment, and the means for generating a 3D representation of a current location of the mobile device within the indoor environment based on the 3D model of the indoor environment includes means for selectively rendering portions of the representation of the 3D model of the indoor environment as opaque based on the profile of the user and the security parameters associated with the indoor environment. Means for receiving the 2D map of the indoor environment from a location server associated with the mobile device. Means for receiving the 2D map of the indoor environment from a server associated with the indoor environment. Means for receiving the customization information at least in part from a server associated with the indoor environment. Means for receiving the customization information at least in part from a user of the mobile device.

An example non-transitory computer-readable medium according to the disclosure, has stored thereon computer-readable instructions for providing improved navigation through an indoor environment using a mobile device. The instructions are configured to cause a computer to access a two-dimensional (2D) map of the indoor environment, access customization information comprising one or more attributes to be applied to a three-dimensional (3D) model of the indoor environment derived from the 2D map of the indoor environment, analyze the 2D map of the indoor environment to extract geometry information associated with the layout of the indoor environment, generate the 3D model of the indoor environment based on the geometry extracted from the 2D map of the indoor environment and the customization information, generate a 3D representation of a current location of the mobile device within the indoor environment based on the 3D model of the indoor environment, and display the 3D representation of the current location of the mobile device within the indoor environment on a display of the mobile device.

Implementations of such a non-transitory computer-readable medium may include one or more of the following features. The instructions configured to cause the computer to display the 3D representation of the current location of the mobile device within the indoor environment on a display of the mobile device include instructions to cause the computer to display a field of view in the 3D representation of the current location of the mobile device based at least in part on the orientation of the mobile device. The customization information includes transparency parameters, and the transparency parameters define levels of transparency to be associated with objects included in the 3D representation of the current location of the mobile device. The customization information includes at least one of texture information and color information, and the texture information identifies one or more textures to be applied to objects included in the 3D representation and the color information identifying one or more colors to be applied to objects included in the 3D representation. The customization information includes route information, the route information identifying a route through the indoor environment, and the instructions to cause the computer to generate a 3D representation of a current location of the mobile device within the indoor environment based on the 3D model of the indoor environment include instructions to cause the computer to render portions of the 3D representation of the current location of the mobile device as partially transparent to emphasize the route through the indoor environment. The customization information includes a user profile associated with a user of the mobile device and security parameters associated with the indoor environment, and the instructions to cause the computer to generate a 3D representation of a current location of the mobile device within the indoor environment based on the 3D model of the indoor environment include instructions to cause the computer to selectively render portions of the representation of the model as opaque based on the profile of the user and the security parameters associated with the indoor environment. Instructions configured to cause the computer to receive the 2D map of the indoor environment from a location server associated with the mobile device. Instructions configured to cause the computer to receive the 2D map of the indoor environment from a server associated with the indoor environment. Instructions configured to cause the computer to receive the customization information at least in part from a server associated with the indoor environment. Instructions configured to cause the computer to receive the customization information at least in part from a user of the mobile device.

An example apparatus for providing improved navigation through an indoor environment using a mobile device according to the disclosure includes: a transceiver configured to transmit and receive data wirelessly, a memory configured to store processor-executable program code, and a processor. The processor is configured to access a two-dimensional (2D) map of the indoor environment, access customization information comprising one or more attributes to be applied to a three-dimensional (3D) model of the indoor environment derived from the 2D map of the indoor environment, analyze the 2D map of the indoor environment to extract geometry information associated with the layout of the indoor environment, generate the 3D model of the indoor environment based on the geometry extracted from the 2D map of the indoor environment and the customization information, generate a 3D representation of a current location of the mobile device within the indoor environment based on the 3D model of the indoor environment, and display the 3D representation of the current location of the mobile device within the indoor environment on a display of the mobile device.

Implementations of such an apparatus may include one or more of the following features. The processor being configured to display the 3D representation of the current location of the mobile device within the indoor environment on a display of the mobile device is further configured to display a field of view in the 3D representation of the current location of the mobile device based at least in part on the orientation of the mobile device. The customization information includes transparency parameters, and the transparency parameters define levels of transparency to be associated with objects included in the 3D representation of the current location of the mobile device. The customization information includes at least one of texture information and color information, the texture information identifies one or more textures to be applied to objects included in the 3D representation and the color information identifying one or more colors to be applied to objects included in the 3D representation. The customization information includes route information, and the route information identifies a route through the indoor environment, and the processor being configured to generate a 3D representation of a current location of the mobile device within the indoor environment based on the 3D model of the indoor environment is further configured to render portions of the 3D representation of the current location of the mobile device as partially transparent to emphasize the route through the indoor environment. The customization information includes a user profile associated with a user of the mobile device and security parameters associated with the indoor environment, and the processor being configured to generate a 3D representation of a current location of the mobile device within the indoor environment based on the 3D model of the indoor environment is further configured to selectively render portions of the representation of the 3D model of the indoor environment as opaque based on the profile of the user and the security parameters associated with the indoor environment. The processor is further configured to receive the 2D map of the indoor environment from a location server associated with the mobile device. The processor is further configured to receive the 2D map of the indoor environment from a server associated with the indoor environment. The processor is further configured to receive the customization information at least in part from a server associated with the indoor environment. The processor is further configured to receive the customization information at least in part from a user of the mobile device.

A method for providing improved navigation information for an indoor environment to a mobile device according to the disclosure includes accessing a two-dimensional (2D) map of the indoor environment, accessing customization information comprising one or more attributes to be applied to a three-dimensional (3D) model of the indoor environment derived from the 2D map of the indoor environment, analyzing the 2D map of the indoor environment to extract geometry information associated with the layout of the indoor environment, generating the 3D model of the indoor environment based on the geometry extracted from the 2D map of the indoor environment and the customization information, and sending the 3D model of the indoor environment to the mobile device.

Implementations of such a method may include one or more of the following features. Receiving a request for the 3D model of the indoor environment of the mobile device from the mobile device. Determining that the mobile device has entered the indoor environment, and sending the 3D model of the indoor environment to the mobile device responsive to determining that the mobile device has entered the indoor environment. Generating a 3D representation of a current location of the mobile device within the indoor environment based on the 3D model of the indoor environment, and sending the 3D representation of the current location of the mobile device within the indoor environment to the mobile device instead of sending the 3D model of the indoor environment. Receiving a request for the 3D representation of a current location of the mobile device from the mobile device. The customization information includes transparency parameters, and the transparency parameters define levels of transparency to be associated with objects included in the 3D representation of the current location of the mobile device. The customization information includes at least one of texture information and color information, and the texture information identifies one or more textures to be applied to objects included in the 3D representation and the color information identifying one or more colors to be applied to objects included in the 3D representation. The customization information includes route information, the route information identifying a route through the indoor environment, and generating a 3D representation of a current location of the mobile device within the indoor environment based on the 3D model of the indoor environment include rendering portions of the 3D representation of the current location of the mobile device as partially transparent to emphasize the route through the indoor environment. The customization information includes a user profile associated with a user of the mobile device and security parameters associated with the indoor environment, and wherein generating a 3D representation of a current location of the mobile device within the indoor environment based on the 3D model of the indoor environment comprises selectively rendering portions of the representation of the model as opaque based on the profile of the user and the security parameters associated with the indoor environment.

An example apparatus for providing improved navigation information for an indoor environment to a mobile device according to the disclosure includes means for accessing a two-dimensional (2D) map of the indoor environment, means for accessing customization information comprising one or more attributes to be applied to a three-dimensional (3D) model of the indoor environment derived from the 2D map of the indoor environment, means for analyzing the 2D map of the indoor environment to extract geometry information associated with the layout of the indoor environment, means for generating the 3D model of the indoor environment based on the geometry extracted from the 2D map of the indoor environment and the customization information, and means for sending the 3D model of the indoor environment to the mobile device.

Implementations of such an apparatus may include one or more of the following features. Means for receiving a request for the 3D model of the indoor environment of the mobile device from the mobile device. Means for determining that the mobile device has entered the indoor environment, and means for sending the 3D model of the indoor environment to the mobile device responsive to determining that the mobile device has entered the indoor environment. Means for generating a 3D representation of a current location of the mobile device within the indoor environment based on the 3D model of the indoor environment, and means for sending the 3D representation of the current location of the mobile device within the indoor environment to the mobile device instead of sending the 3D model of the indoor environment. Means for receiving a request for the 3D representation of a current location of the mobile device from the mobile device. The customization information includes transparency parameters, and the transparency parameters define levels of transparency to be associated with objects included in the 3D representation of the current location of the mobile device. The customization information includes at least one of texture information and color information, and the texture information identifies one or more textures to be applied to objects included in the 3D representation and the color information identifying one or more colors to be applied to objects included in the 3D representation. The customization information includes route information, the route information identifying a route through the indoor environment, and the means for generating a 3D representation of a current location of the mobile device within the indoor environment based on the 3D model of the indoor environment includes means for rendering portions of the 3D representation of the current location of the mobile device as partially transparent to emphasize the route through the indoor environment. The customization information includes a user profile associated with a user of the mobile device and security parameters associated with the indoor environment, and the means for generating a 3D representation of a current location of the mobile device within the indoor environment based on the 3D model of the indoor environment includes means for selectively rendering portions of the representation of the model as opaque based on the profile of the user and the security parameters associated with the indoor environment.

An example apparatus for providing improved navigation information for an indoor environment to a mobile device according to the disclosure includes a transceiver configured to transmit and receive data wirelessly, a memory configured to store processor-executable program code, and a processor. The processor is configured to access a two-dimensional (2D) map of the indoor environment, access customization information comprising one or more attributes to be applied to a three-dimensional (3D) model of the indoor environment derived from the 2D map of the indoor environment, analyze the 2D map of the indoor environment to extract geometry information associated with the layout of the indoor environment, generate the 3D model of the indoor environment based on the geometry extracted from the 2D map of the indoor environment and the customization information, and send the 3D model of the indoor environment to the mobile device.

Implementations of such an apparatus may include one or more of the following features. The processor is further configured to receive a request for the 3D model of the indoor environment of the mobile device from the mobile device. The processor is further configured to determine that the mobile device has entered the indoor environment, and send the 3D model of the indoor environment to the mobile device responsive to determining that the mobile device has entered the indoor environment. The processor is further configured to generate a 3D representation of a current location of the mobile device within the indoor environment based on the 3D model of the indoor environment, and send the 3D representation of the current location of the mobile device within the indoor environment to the mobile device instead of sending the 3D model of the indoor environment. The processor is further configured to receive a request for the 3D representation of a current location of the mobile device from the mobile device. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation. The customization information includes route information, the route information identifying a route through the indoor environment, and the processor being configured to generate the 3D representation of a current location of the mobile device within the indoor environment based on the 3D model of the indoor environment is further configured to render portions of the 3D representation of the current location of the mobile device as partially transparent to emphasize the route through the indoor environment. The customization information includes a user profile associated with a user of the mobile device and security parameters associated with the indoor environment, and the processor being configured to generate the 3D representation of a current location of the mobile device within the indoor environment based on the 3D model of the indoor environment is further configured to selectively render portions of the representation of the model as opaque based on the profile of the user and the security parameters associated with the indoor environment.

An example non-transitory computer-readable medium according to the disclosure, has stored thereon computer-readable instructions for providing improved navigation information for an indoor environment to a mobile device. The instructions are configured to cause a computer to access a two-dimensional (2D) map of the indoor environment, access customization information comprising one or more attributes to be applied to a three-dimensional (3D) model of the indoor environment derived from the 2D map of the indoor environment, analyze the 2D map of the indoor environment to extract geometry information associated with the layout of the indoor environment, generate the 3D model of the indoor environment based on the geometry extracted from the 2D map of the indoor environment and the customization information, and send the 3D model of the indoor environment to the mobile device.

Implementations of such a non-transitory computer-readable medium may include one or more of the following features. Instructions configure to cause the computer to receive a request for the 3D model of the indoor environment of the mobile device from the mobile device. Instructions configured to cause the computer to determine that the mobile device has entered the indoor environment, and send the 3D model of the indoor environment to the mobile device responsive to determining that the mobile device has entered the indoor environment. Instructions configured to cause the computer to generate a 3D representation of a current location of the mobile device within the indoor environment based on the 3D model of the indoor environment, and send the 3D representation of the current location of the mobile device within the indoor environment to the mobile device instead of sending the 3D model of the indoor environment. Instructions configured to cause the computer to receive a request for the 3D representation of a current location of the mobile device from the mobile device. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation. The customization information includes route information, the route information identifying a route through the indoor environment, and the instructions configured to cause the computer to generate the 3D representation of a current location of the mobile device within the indoor environment based on the 3D model of the indoor environment include instructions configured to cause the computer to render portions of the 3D representation of the current location of the mobile device as partially transparent to emphasize the route through the indoor environment. The customization information includes a user profile associated with a user of the mobile device and security parameters associated with the indoor environment, and the instructions configured to cause the computer to generate the 3D representation of a current location of the mobile device within the indoor environment based on the 3D model of the indoor environment include instructions configured to cause the computer to selectively render portions of the representation of the model as opaque based on the profile of the user and the security parameters associated with the indoor environment.

A method for providing improved navigation through an indoor environment using a mobile device according to the disclosure includes receiving a three-dimensional (3D) model of the indoor environment; accessing customization information comprising one or more attributes to be applied to the 3D model of the indoor environment; applying the customization information to the 3D model of the indoor; generating a 3D representation of a current location of the mobile device within the indoor environment based on the 3D model of the indoor environment; and displaying the 3D representation of the current location of the mobile device within the indoor environment on a display of the mobile device.

Implementations of such a method may include one or more of the following features. Displaying the 3D representation of the current location of the mobile device within the indoor environment on a display of the mobile device includes displaying a field of view in the 3D representation of the current location of the mobile device based at least in part on the orientation of the mobile device. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation. The customization information includes route information, the route information identifying a route through the indoor environment, and generating a 3D representation of a current location of the mobile device within the indoor environment based on the 3D model of the indoor environment includes rendering portions of the 3D representation of the current location of the mobile device as partially transparent to emphasize the route through the indoor environment. Receiving the 3D model of the indoor environment includes receiving the 3D model of the indoor environment from a navigation server.

An apparatus for providing improved navigation through an indoor environment using a mobile device according to the disclosure includes means for receiving a three-dimensional (3D) model of the indoor environment; means for accessing customization information comprising one or more attributes to be applied to the 3D model of the indoor environment; means for applying the customization information to the 3D model of the indoor; means for generating a 3D representation of a current location of the mobile device within the indoor environment based on the 3D model of the indoor environment; and means for displaying the 3D representation of the current location of the mobile device within the indoor environment on a display of the mobile device.

Implementations of such an apparatus may include one or more of the following features. The means for displaying the 3D representation of the current location of the mobile device within the indoor environment on a display of the mobile device includes means for displaying a field of view in the 3D representation of the current location of the mobile device based at least in part on the orientation of the mobile device. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation. The customization information includes route information, the route information identifying a route through the indoor environment, and wherein the means for generating a 3D representation of a current location of the mobile device within the indoor environment based on the 3D model of the indoor environment comprises means for rendering portions of the 3D representation of the current location of the mobile device as partially transparent to emphasize the route through the indoor environment. The means for receiving the 3D model of the indoor environment comprises include means for receiving the 3D model of the indoor environment from a navigation server.

An example non-transitory computer-readable medium, having stored thereon computer-readable instructions for providing improved navigation through an indoor environment using a mobile device, according to the disclosure includes instructions configured to cause a computer to: receive a three-dimensional (3D) model of the indoor environment; access customization information comprising one or more attributes to be applied to the 3D model of the indoor environment; apply the customization information to the 3D model of the indoor; generate a 3D representation of a current location of the mobile device within the indoor environment based on the 3D model of the indoor environment; and display the 3D representation of the current location of the mobile device within the indoor environment on a display of the mobile device.

Implementations of such a non-transitory computer-readable medium may include one or more of the following features. The instructions configured to cause the computer to display the 3D representation of the current location of the mobile device within the indoor environment on a display of the mobile device further include instructions configured to cause the computer to display a field of view in the 3D representation of the current location of the mobile device based at least in part on the orientation of the mobile device. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation. The customization information includes route information, the route information identifying a route through the indoor environment, and wherein generating a 3D representation of a current location of the mobile device within the indoor environment based on the 3D model of the indoor environment comprises rendering portions of the 3D representation of the current location of the mobile device as partially transparent to emphasize the route through the indoor environment. The instructions configured to cause the computer to receive the 3D model of the indoor environment include instructions configured to cause the computer to receive the 3D model of the indoor environment from a navigation server.

An apparatus for providing improved navigation through an indoor environment using a mobile device according to the disclosure includes a transceiver configured to transmit and receive data wirelessly, a memory configured to store processor-executable program code; and a processor. The processor is configured to: receive a three-dimensional (3D) model of the indoor environment; access customization information comprising one or more attributes to be applied to the 3D model of the indoor environment; apply the customization information to the 3D model of the indoor; generate a 3D representation of a current location of the mobile device within the indoor environment based on the 3D model of the indoor environment; and display the 3D representation of the current location of the mobile device within the indoor environment on a display of the mobile device.

Implementations of such an apparatus may include one or more of the following features. The processor being configured to display the 3D representation of the current location of the mobile device within the indoor environment on a display of the mobile device is further configured to display a field of view in the 3D representation of the current location of the mobile device based at least in part on the orientation of the mobile device. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation. The customization information includes route information, the route information identifying a route through the indoor environment, and wherein generating a 3D representation of a current location of the mobile device within the indoor environment based on the 3D model of the indoor environment comprises rendering portions of the 3D representation of the current location of the mobile device as partially transparent to emphasize the route through the indoor environment. The processor being configured to receive the 3D model of the indoor environment is further configured to receive the 3D model of the indoor environment from a navigation server.

An example method for providing improved navigation through an indoor environment using a mobile device according to the disclosure includes sending a request to a navigation server for a three-dimensional (3D) representation of a current location of the mobile device; sending customization information comprising one or more attributes to be applied to the 3D representation of the indoor environment by the navigation server; receiving the 3D representation of a current location of the mobile device within the indoor environment from the navigation server; and displaying the 3D representation of the current location of the mobile device within the indoor environment on a display of the mobile device.

Implementations of such a method may include one or more of the following features. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation.

An example apparatus for providing improved navigation through an indoor environment using a mobile device according to the disclosure includes means for sending a request to a navigation server for a three-dimensional (3D) representation of a current location of the mobile device; means for sending customization information comprising one or more attributes to be applied to the 3D representation of the indoor environment by the navigation server; means for receiving the 3D representation of a current location of the mobile device within the indoor environment from the navigation server; and means for displaying the 3D representation of the current location of the mobile device within the indoor environment on a display of the mobile device. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation.

An example non-transitory computer-readable medium, having stored thereon computer-readable instructions for providing improved navigation through an indoor environment using a mobile device, according to the disclosure includes instructions configured to cause a computer to: send a request to a navigation server for a three-dimensional (3D) representation of a current location of the mobile device; send customization information comprising one or more attributes to be applied to the 3D representation of the indoor environment by the navigation server; receive the 3D representation of a current location of the mobile device within the indoor environment from the navigation server; and display the 3D representation of the current location of the mobile device within the indoor environment on a display of the mobile device.

Implementations of such a non-transitory computer-readable medium may include one or more of the following features. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation.

An example apparatus for providing improved navigation through an indoor environment using a mobile device according to the disclosure includes a transceiver configured to transmit and receive data wirelessly; a memory configured to store processor-executable program code; and a processor. The processor is configured to: send a request to a navigation server for a three-dimensional (3D) representation of a current location of the mobile device; send customization information comprising one or more attributes to be applied to the 3D representation of the indoor environment by the navigation server; receive the 3D representation of a current location of the mobile device within the indoor environment from the navigation server; and display the 3D representation of the current location of the mobile device within the indoor environment on a display of the mobile device.

Implementations of such an apparatus may include one or more of the following features. The customization information includes transparency parameters, the transparency parameters defining levels of transparency to be associated with objects included in the 3D representation of the current location of the mobile device. The customization information includes at least one of texture information and color information, the texture information identifying one or more textures to be applied to objects included in the 3D representation and the color information identifying one or more colors to be applied to objects included in the 3D representation.

Items and/or techniques described herein may provide one or more of the following capabilities, as well as other capabilities not mentioned.

BRIEF DESCRIPTIONS OF THE DRAWINGS

FIG. 7 is a block flow diagram of another process for providing improved navigation through an indoor environment using a mobile device.

FIG. 8 is a block flow diagram of a process for generating a 3D model of an indoor environment from a 2D map of the indoor environment for a mobile device 120.

Figure 12A:
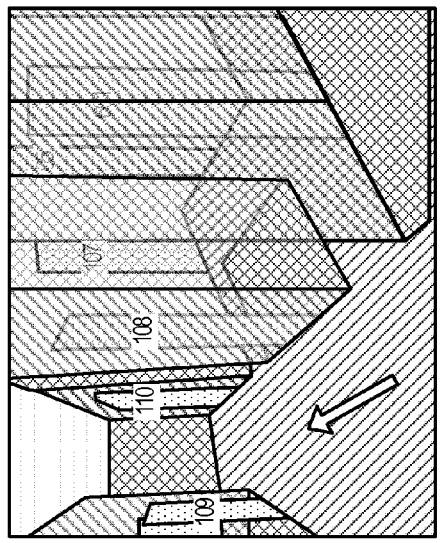
Figure 12B:
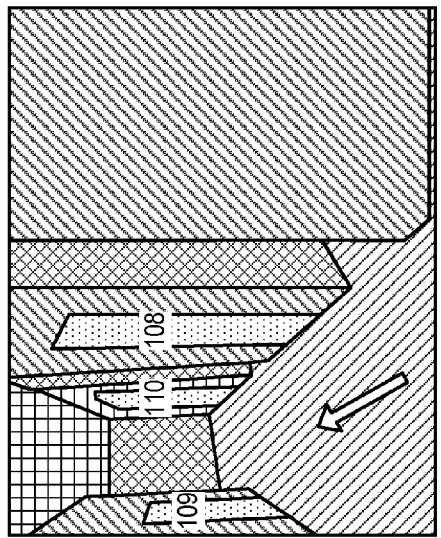
Figure 12C:
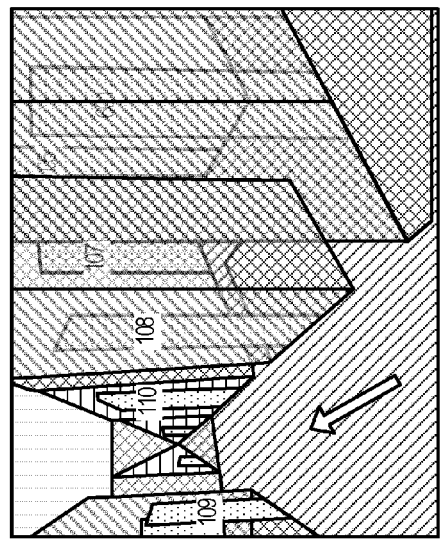

FIGS. 12A, 12B, and 12C are diagrams illustrating 3D representations of the current location of a mobile device within an indoor that include different levels of transparency applied to the components of the indoor environment.

DETAILED DESCRIPTION

Techniques for improved navigation of an indoor environment are provided that include generating a 3D map of an indoor environment based on a 2D map of the indoor environment and presenting a 3D representation of the current location of a mobile device based on the 3D model. The mobile device can comprise a mobile phone, a tablet computer, and/or other mobile device that is capable of communicating with a wireless network and is capable of displaying a 3D rendering of the indoor environment to the user of the mobile device. In some implementations, the 2D to 3D conversion and rendering of a 3D representation of the location of the user in the indoor environment can be performed on the mobile device. In other implementations, at least some of the steps involved in the 2D to 3D conversion and rendering of the 3D representation of the location of the user in the indoor environment can be performed by a remote navigation server. For example, if the mobile device is not capable of performing the 2D to 3D conversion, the remove server can be configured to receive location information that identifies the position of the mobile device within the indoor environment, to render images representing a 3D view of the current location of the mobile device, and to transmit those images to the mobile device for display to the user.

Figure 1:
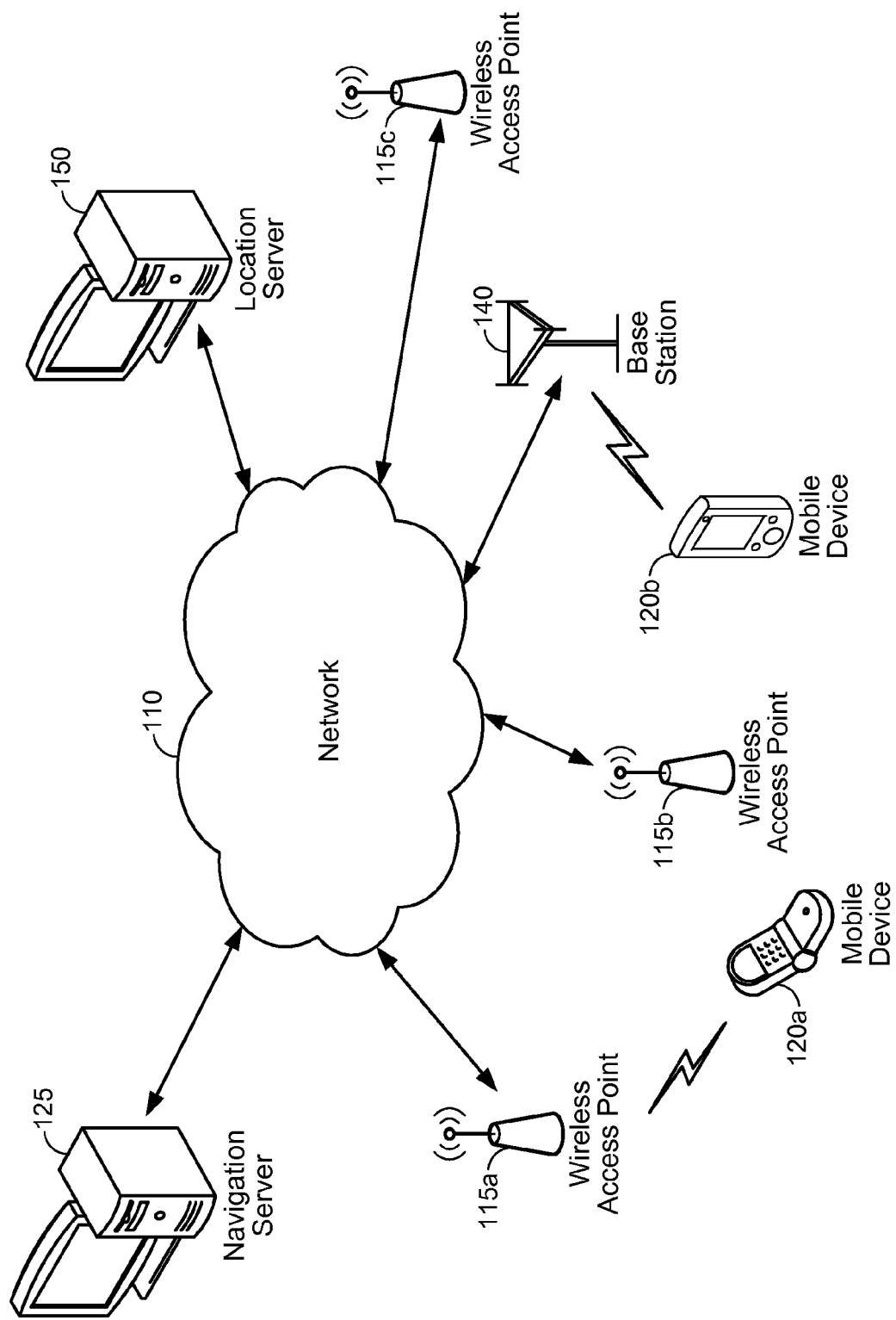
FIG. 1 is a simplified diagram of a wireless communication system.

FIG. 1 is a simplified diagram of an example wireless communication system in which the techniques for improved navigation of an indoor environment disclosed herein can be implemented. In the example illustrated in FIG. 1, the wireless network environment includes wireless access points 115 (where each instance of a wireless access point is labeled with a separate letter—e.g., 115a, 115b, and 115c), a base station 140, a plurality of mobile devices 120 (where each instance of which is labeled with a separate letter—e.g., 120a, 120b), a network 110, a navigation server 125, a location server 150.

The example network environment illustrated in FIG. 1 includes a three wireless access points 115a, 115b, and 115c, but other network environments that can be used to implement the techniques disclosed herein may include more wireless access points. Furthermore, the wireless access points may be distributed throughout an indoor environment and may be placed on different floors within the indoor environment. The term "access point" is used for simplicity, but refers to communication devices, more generally, one example of which include access points in wireless local area networks, such as IEEE 802 series compliant networks including the IEEE 802.11 family of standards commonly referred to as Wi-Fi. For example, devices that use Bluetooth can be communication devices according to the disclosure. As such, the usage of the term access point is not exclusive of other kinds of communication networks. Furthermore, a wireless access point 115 can be configured to implement other wireless communications standards in addition or instead of standards from the IEEE 802 series. The wireless access point 115 can also be implemented as a femtocell or picocell that is configured to operate a base station for a mobile communications network. A wireless access point 115 can either be located at a fixed location or may be mobile. For example, a wireless access point 115 can be a mobile device that is configured to provide a WiFi hotspot and is configured to wirelessly connect to a mobile communication network, e.g. a WAN to provide network connectivity to the Wi-Fi hotspot.

The base station 140 can be configured to wirelessly communicate with a plurality of mobile devices, such as mobile devices 120a and 120b. The base station 140 may be located within the indoor environment and/or may provide a coverage area that overlaps with at least a portion of the indoor environment. The base station 140 can be associated with a mobile communications network provider and can be configured to communication using one or more wireless communications protocols for mobile devices. For example, the base station 140 can be configured to use on more of the wireless communications protocols, such as Code Division Multiple Access (CDMA), Time Division Multiple Access (TDMA), Frequency Division Multiple Access (FDMA), Orthogonal FDMA (OFDMA), and Single-Carrier FDMA (SC-FDMA), Long Term Evolution (LTE), and/or other wireless communications protocols. For example, the base station 140 can be an evolved Node B (eNB) in a wireless communication system implanting the LTE wireless communications standards. The wireless communications discussed herein are only examples of some of the types of wireless protocols that may be implemented by the base station 140, and are not intended to limit the techniques discussed herein to wireless communication networks using these protocols. The network environment illustrated in FIG. 1 only illustrates a single base station 140, but an indoor environment such as those where the techniques disclosed herein may be implemented may be within the coverage area of multiple base stations 140.

The example network environment illustrated in FIG. 1 also includes two mobile devices 120a and 120b, but other network environments that can be used to implement the techniques disclosed herein may include either more or less mobile devices. The mobile devices 120a and 120b can be configured to communicate with one or more servers, such as navigation server 125 and/or location server 150. The mobile devices 120a and 120b can be configured to communicate with the servers through one of the wireless access points 115 or the wireless base station 140.

The navigation server 125 can be configured to store electronic content, such as applications, that can be provided to one or more mobile devices 120 and can be executed by the mobile devices 120. In other implementations, the network environment may contain other servers (not shown) that can also be configured to provide information and/or electronic content to the mobile devices 120a and 120b. The navigation server 125 can be configured to provide 2D and/or 3D map information for indoor environments to the mobile devices 120. The navigation server 125 may be implemented by an owner or manager of an indoor environment or may be implemented by a third party, such as a wireless network service provider. An example implementation of a navigation server that can be used to implement the navigation server 125 is provided in FIG. 4.

The location server 150 can be configured to provide location based services, such as determining the position of the mobile device 120 and/or providing assistance data that the mobile devices 120 can use to determine the position of the mobile devices 120. An example implementation of a navigation server that can be used to implement the navigation server 125 is provided in FIG. 5. In some implementations, the navigation server 125 and the location server 150 can be implemented on the same server.

Figure 2:
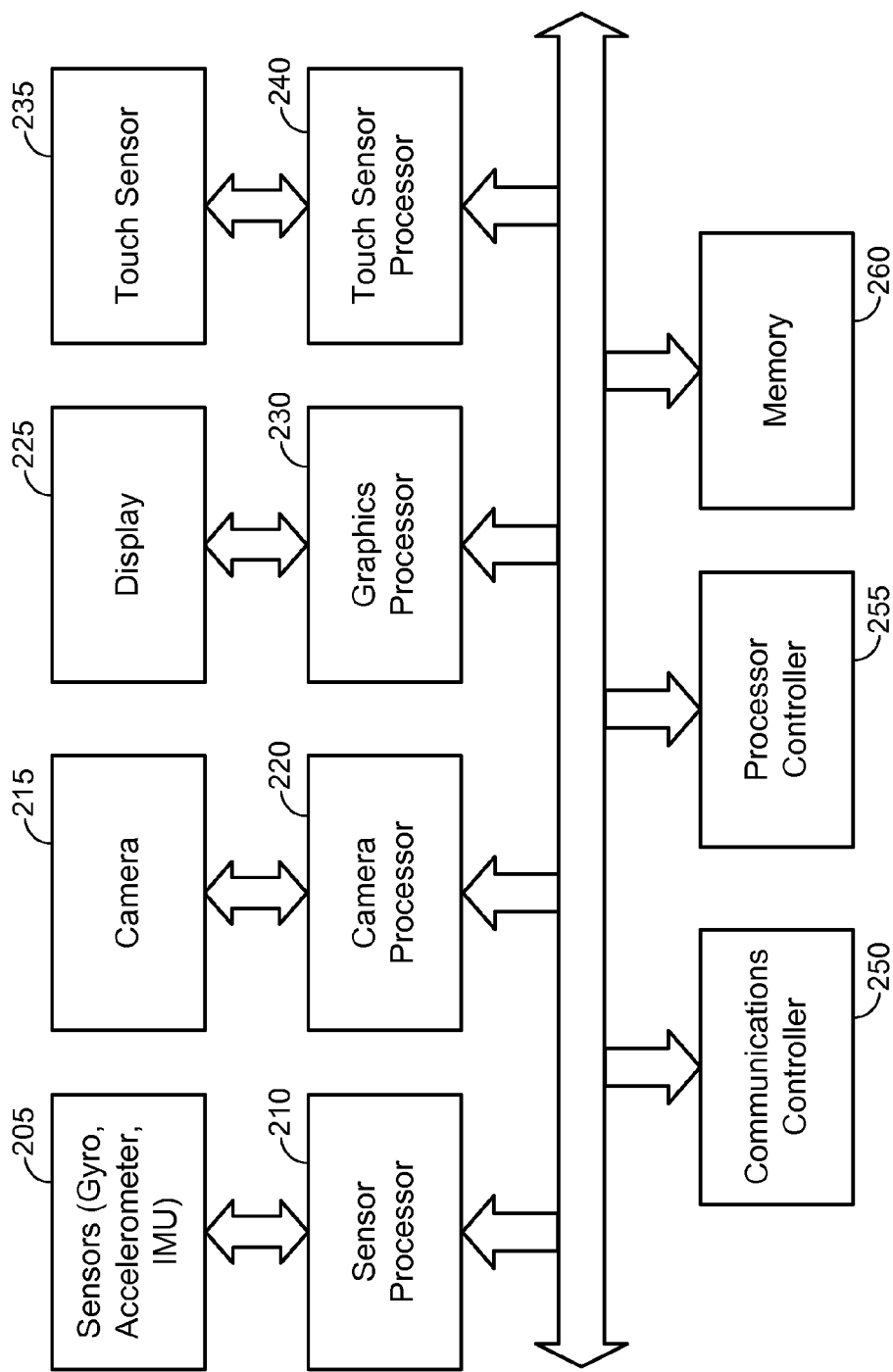
FIG. 2 is a functional block diagram of a mobile device that can be used to implement the mobile devices illustrated in FIG. 1.

FIG. 2 is an example of a system architecture that can be used to implement a mobile device, such as the mobile devices 120a and 120b illustrated in FIG. 1. A mobile device 120 may include some or all of the components illustrated in FIG. 2 and may include additional components illustrated in FIG. 3 and can be configured to implement various functions, such as the processes illustrated in FIGS. 6-10 described in detail below.

The mobile device 120 can include sensors 205 (e.g., gyros, accelerometers, an inertial measurement unit (IMU) and/or other types of sensors) and a sensor processor 210 for processing data collected by the sensors 205. Data collected by the sensors may be used to determine an orientation of the mobile device, acceleration or velocity of the mobile device, and/or other information that may be useful in determining the location of the mobile device 120. The data collected by the sensor 205 can also be used to provide inputs to one or more applications on the mobile device 120. The mobile device 120 can be configured to use the data collected by the sensors 205 to determine how the phone is oriented and can use that information in addition to the estimated position of the mobile device within an indoor environment to generate a field of view into a 3D representation of the indoor environment and to display that 3D representation on the mobile device 120. The field of view into the 3D representation of the indoor environment can provide the user with an augmented view of the indoor environment in which they are located that can assist the user in navigating through the indoor environment.

The mobile device 120 can also include a camera 215 and a camera processor 220. The camera 215 can be configured to capture images and/or video content. The camera processor 220 can be configured to process the data collected by the camera 215 and to convert the data collected by the camera into a format that can be used by one or more applications on the mobile device 120 and/or viewed on the display 225 of the mobile device 120. The camera processor 220 can be configured to perform various types of image or video processing on the data collected from the camera to prepare the content for display on display 225. The mobile device 120 can be configured to allow a user of the mobile device 120 to use the camera 215 to capture color and/or texture information that can be applied to a 3D model of an indoor environment derived from a 2D map of the indoor environment. For example, a user of the mobile device 120 can use the camera 215 to capture the texture and/or color of the walls, floors, doors, and/or other elements of an indoor environment and associate the captured textures and/or colors with elements of 2D map of the indoor environment. The mobile device 120 and/or the navigation server 125 can be configured to apply the captured colors and/or textures to the 3D representation of the indoor environment derived from the 2D map of the indoor environment.

The display 225 can be touch screen interface that includes touch sensor 235. The graphics processor 230 can be used to generate graphical data for display on display 225. Applications on the mobiles station 12 and/or other executable programs, such as the operating system and the positioning engine, can be implemented in software and/or hardware and can be configured to send commands to the graphics processor 230 to display image or video content on the display 225. Touch sensor processor 240 can process data output by the touch sensor 235 to identify when a user touches the touch screen. The touch sensor process 240 can be configured to identify various touch gestures, including multi-finger touches of the touch screen. The operating system, applications, and/or the positioning engine can use the gesture information determined by the touch sensor processor 240 to determine, at least in part, receive and respond to user input. The display 225 of the mobile device 120 can be a 2D display or can be a 3D display capable of displaying stereoscopic images. The mobile device 120 can be configured to render 2D and/or 3D content depending upon the capabilities of the display 225 and the configuration of the mobile device 120.

The communications controller 250 can be configured to enable the device to communicate using one or more wireless protocols and to enable the mobile device to communicate with one more devices via the network 110. The communications controller 250 can be configured to allow the device to send and receive data from nearby wireless devices, including wireless access point and other mobile devices 120. For example, the communications controller 250 can be configured to enable the mobile device 120 to communicate either directly or indirectly with the wireless access points 115, the base station 140, the navigation server 125, the location server 150, and other mobile devices 120. The communications controller 250 can also be configured to enable the mobile device 120 to receive navigation signals that the mobile device 120 can use to determine its location. For example, the communications controller 250 can be configured to receive signals from satellite vehicles (SVs) belonging to one or more Satellite Positioning Systems (SPSs), such as the GPS system, the GLONASS system, the Galileo system, and/or other SPSs.

The memory 260 includes volatile and/or persistent memory for storing data used by various components of the mobile device 120. The memory 260 can be used to store processor-executable program code for one or more of the processors included in the device. The processor controller 255 can be configured to control one or more of the sensor processor 210, camera processor 220, the graphics processor 230, and the touch sensor processor 240. One or more of the sensor processor 210, camera processor 220, the graphics processor 230, and the touch sensor processor 240 may also be implemented by the processor controller 255. The processor controller 255 can also be configured to execute processor-executable program code.

Figure 3:
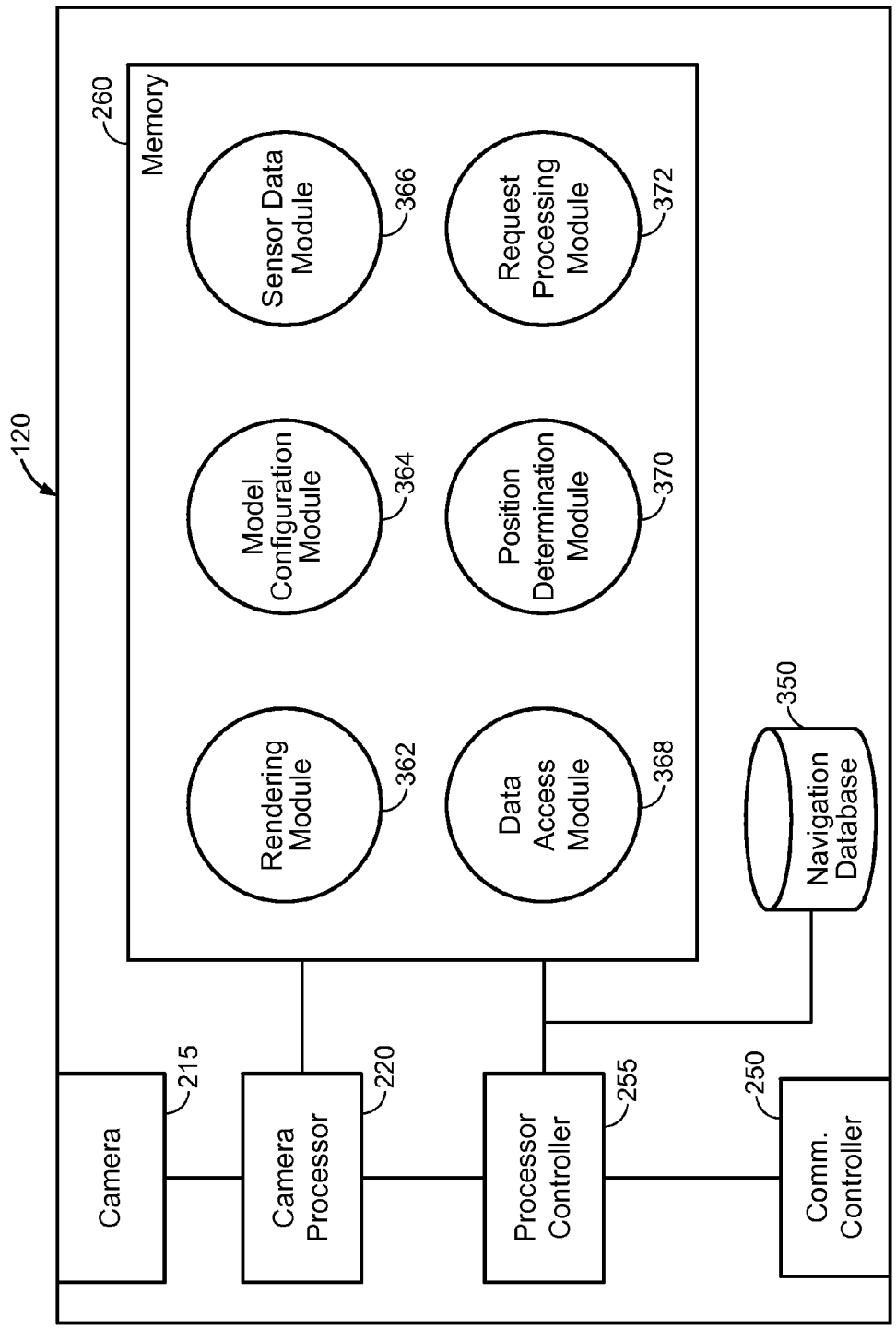
FIG. 3 is a functional block diagram of the mobile device illustrated in FIG. 1 that illustrates functional modules of a memory shown in FIG. 2.

FIG. 3 is a functional block diagram of the mobile device illustrated in FIG. 1 that illustrates functional modules of a memory shown in FIG. 2. For example, the mobile device 120 can include a rendering module 362, a model configuration module 364, a sensor data module 366, a data access module 368, a position determination module 370, and a request processing module 372. The mobile device 120 can include a navigation database 350.

The rendering module 362 can be configured to render a 3D model of an indoor environment based on a 2D map of the environment. In some implementations, the mobile device 120 can be configured to render a 3D model of an indoor environment based on a 2D map of the indoor environment. The rendering module 362 can be configured to access the 2D map of the indoor environment from the navigation database 350 or receive the 2D map from the navigation server 125.

The rendering module 362 can be configured analyze the 2D map of the indoor environment and to derive a 3D model of the indoor environment from the 2D map. The rendering module 362 can be configured to identify basic structural components of the indoor environment, such as walls, doors, windows, floors and ceilings. The rendering module 362 can also be configured to make some basic assumptions about the structure of the indoor environment if the 2D map of the indoor environment does not provide information to the contrary. The rendering module 362 can be configured to make the assumption that the floors and ceilings are parallel to the ground unless otherwise specified by the 2D map. For example, the rendering module 362 could be configured to recognize that the indoor environment includes a ramp at a particular location and could render the floor in that portion of the floor to be sloped rather than perpendicular to a ground plane. The rendering module 362 can also be configured to assume that the walls and doors are placed perpendicular to the floor unless otherwise specified by the 2D map.

The rendering module 362 can also be configured to access customization information associated with the map of the indoor environment from the navigation database 350 or the navigation server 125. The rendering module 362 can be configured to request customization information from the navigation server 125. The customization information can be used to define one or more attributes to be applied to the 3D model derived from the 2D map of the indoor environment. The customization information can be received from a user of the mobile device and/or may be associated with the map of the 2D environment. For example, the rendering module 362 can be configured to accept customization information provided by a user of the mobile device via the model configuration module 364. Customization information can also be associated with a 2D map of an indoor environment and may, for example, be provided by the navigation server 125. For example, an owner or manager of an indoor environment, such as an office building, a shopping mall, or airport might provide customization information along with a 2D map of the environment and the customization information can be used when deriving a 3D model of the indoor environment from the 2D map. For example, the customization information can associate colors and/or textures with particular components of the indoor environment. The colors and/or textures associated with the components of the indoor environment can be similar to those actually used in the indoor environment, which would enable the rendering module 362 to generate a 3D model of the indoor environment that provides a more accurate representation of the actual indoor environment.

The rendering module 362 can also be configured to selectively render components of the indoor environment with varying levels of transparency. Rendering components of the indoor environment as semi-transparent can provide the user with a 3D view of the indoor environment that is less claustrophobic than a view where the components of the indoor environment are rendered as completely opaque. Rendering components of the indoor environment as semi-transparent also can provide the user with a better understanding of the layout of the indoor environment surrounding the user than would be provided if the components of 3D model of the indoor environment are all rendered as completely opaque. FIGS. 12A, 12B, and 12C illustrate examples of a 3D representation of the current location of a mobile device within an indoor environment that have been rendered from a 3D model of the indoor environment. In the example provided in FIG. 12A, the walls, doors, floor, and ceiling and other components of the indoor environment have been rendered as completely opaque. In the example provided in FIG. 12B, the components of the indoor environment that are closer to the current position of the mobile device has been rendered as semi-transparent while those that are farther from the current position of the mobile device have been rendered as opaque. In the example provided in FIG. 12C, the components of the indoor environment farther from the mobile device (when compared to the transparency levels in FIG. 12B) are rendered as semi-transparent.

The rendering module 362 can be configured to selectively render certain portions of the indoor environment as opaque. In some implementations, the rendering module 362 can be configured to render portions of the indoor environment as opaque that are not accessible to the user of the mobile device or that the user of the mobile device is not permitted to view. For example, the rendering module 362 can be configured identify annotations on the 2D map that indicate that certain portions of the indoor environment should not be visible to the user of a mobile device. In some implementations, portions of an indoor environment can be associated with a user security profile level, and only users having a security level greater than or equal to the security level associated with a portion of the indoor environment will be allowed to see details of that portion of the indoor environment. In some implementations, the rendering module 362 can be configured to receive customization information from the navigation server 125 that identifies which components of the 3D model should be rendered as opaque. The owner or manager of the indoor environment can provide this information to the navigation server 125. The rendering module 362 can also be configured to receive pre-rendered 3D models from the navigation server in which certain portions of the 3D model are rendered as opaque.

The rendering module 362 can be configured to receive position information from the position determination module 370. The rendering module 362 can be configured to use this position information to render a 3D representation of the current location of the mobile device based on the 3D model. The 3D representation of the current location of the mobile device can be displayed on the display 225 of the mobile device 120. The rendering module 362 can also be configured to receive information regarding the orientation of the mobile device to determine a "field of view" for the mobile device. FIGS. 12A, 12B, and 12C illustrate examples of such a field of view. The rendering module 362 can also be configured to automatically update the 3D representation of the field of view as the position or orientation of the mobile device 120 changes. For example, if the user of the mobile device tilts the mobile device downward, the rendering module 362 can be configured to update the field of view 3D representation of the field of view accordingly. As a result, the user of the mobile device 120 can tilt and/or pan the camera and the rendering module 362 can generate an updated 3D representation of the indoor environment on the display 225 in response to this movement to allow the user of the mobile device 120 to see different portions of the 3D model of the indoor environment.

The model configuration module 364 can be configured to allow a user of the mobile device 120 to provide customization information that can be applied to a 3D model of an indoor environment generated by the rendering module 362. The model configuration module 364 can be configured to provide a user interface that allows a user of the mobile device 120 to customize aspects of a 3D model to be generated by the rendering module 362. For example, the model configuration module 364 can provide a user interface that displays the 2D map of the user environment and allows the user to select components of the indoor environment on the 2D map, such as floors, walls, windows, and doors, and to associate colors and/or textures with those components. In some implementations, the model configuration module 364 can be configured to provide a list of components associated with indoor environments from which the user of the mobile device can a select components to associate with a color and/or texture.

Figure 11:
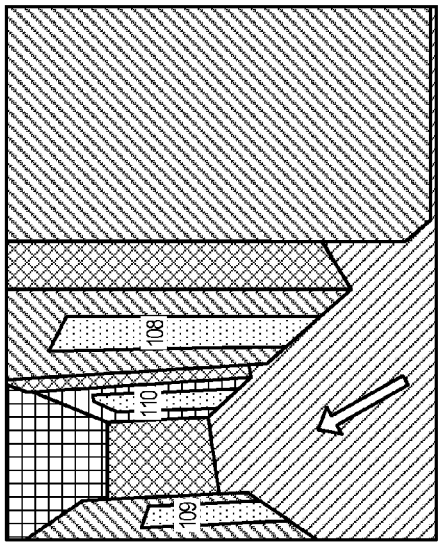
FIG. 11 is a diagram illustrating customizing a 3D model generated from a 2D map of an indoor environment.
Figure 11:
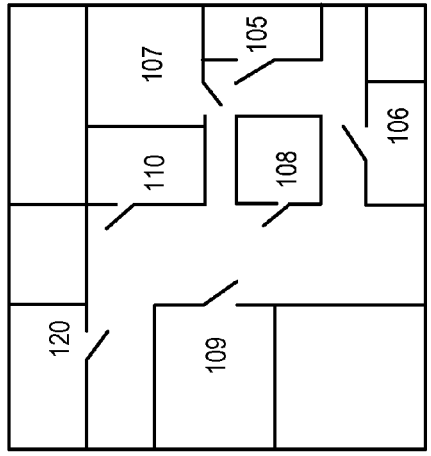

The model configuration module 364 can be configured to provide a default set of colors and/or textures from which a user can select colors and/or textures to be applied by the rendering module 362 and to allow the user to select transparency levels to be associated with types of components in the indoor environment. FIG. 11 illustrates an example of a different colors being associated with components of an indoor environment that are applied to the 3D model and can be seen in a 3D representation of the current location of the mobile device 120. A 2D map of an indoor environment is provided on the left. In the center, a set of colors are displayed and the components with which those colors are associated have been provided. On the left, a 3D representation of the current location of the mobile device is provided that illustrates the colors applied to the components of the 3D model of the indoor environment.

The model configuration module 364 can also be configured to allow the user to capture colors and/or textures to be applied to components of the indoor environment using the camera 215 of the mobile device 120. For example, the model configuration module 364 can be configured to provide a user interface that allows a user of the mobile device 120 to capture an image of a wall of an indoor environment and the model configuration module 364 can be configured to determine a predominate color in the captured image and to apply that color to the walls in the 3D model derived from the 2D map of the indoor environment. The model configuration module 364 can also be configured to allow the user of the mobile device to capture a texture that can be applied to components of the 3D model of the indoor environment. For example, a user of the mobile device 120 could capture a wood grain pattern from a door and the model configuration module 364 can be configured to apply that texture to doors in the 3D model of the indoor environment. The model configuration module 364 can be configured to store the colors and/or textures associated with a particular indoor environment in the navigation database 350 and/or can be configured to send the color and/or textures associated with the indoor environment to the navigation server 125, which can also be configured to store this information for use in rendering 3D models of the indoor environment. The model configuration module 364 can also be configured to allow the user of the mobile device to associate different levels of transparency with different components of the indoor environment. In one example, a user might set the floor and ceiling to be opaque, the walls to a first level of transparency, and doors and windows to a second level of transparency.

The model configuration module 364 can also be configured to receive customization information that identifies a route through the indoor environment. For example, the location server 150 and/or the position determination module 370 can be configured to provide a route through the indoor environment. The model configuration module 364 can be configured to provide the route information to the rendering module 362 and the rendering module 362 can be configured to use this route information when rendering the 3D model and/or 3D representations of the current location of the mobile device 120. The rendering module 362 can be configured adjust the transparency levels of components of the indoor environment along the route to be semi-transparent to emphasize details of the route to the user when generating 3D representations of the current position of the mobile device. The rendering module 362 can also be configured to apply a particular color and/or texture to components along the route to emphasize the route. For example, the model configuration module 364 can be configured to apply an arrow texture to the floor of the 3D model indicating the direction of travel. The rendering module 362 can also be configured to receive updated route information and/or position information for the mobile device 120 and to update the rendering of the 3D model and/or the 3D representation of the current location of the mobile device 120 within the indoor environment accordingly.

The model configuration module 364 can be configured to allow a user of the mobile device 120 to select transparency levels to be applied to components of the indoor environment. For example, the model configuration module 364 can provide a user interface that allows the user of the mobile device to select a transparency level to be associated with components of the 3D model of the indoor environment. For example, the model configuration module 364 can be configured to provide a user interface that allows the user to specify a level of transparency to be applied to components of the 3D model based on a distance from the current location of the mobile device. The examples illustrated in FIGS. 12B and 12C provide examples of the transparency level being associated with distance. When the rendering module 362 generates a 3D representation of the current location of the mobile device, components closer than the specified distance can be rendered as semi-transparent, while components of the 3D representation farther than the specified distance from the current location of the mobile device would be rendered as opaque. The rendering module 362 can be configured such that components of the indoor environment farther from the current position of the mobile device are rendered to appear more opaque than those objects closer to the current position of the mobile device.

The sensor data module 366 can be configured to receive information collected by the sensors 205. The data collected by the sensors 205 can be received and processed by the sensor processor 210 and/or may be transferred to the sensor data module 366 by the sensor processor 210 as the sensor data is received from the sensors 205. The sensor data module 366 can be configured to provide sensor data to the position determination module 370, the rendering module 362, and/or other modules or applications on the mobile device 120. For example, the sensor data module 366 can be configured to determine an orientation of the mobile device 120 based on information collected by the sensors 205, and the sensor data module 366 can provide the orientation to the rendering module 362. The rendering module 362 can be configured to use the orientation information to determine a field of view of the mobile device 120 when rendering a 3D representation of the current position of the mobile device based on the 3D model of the indoor environment.

The data access module 368 can be configured to access data stored in the memory 460 of the mobile device 120 and/or in the navigation database 350. The data access module 368 can be configured to access data stored in or to store data in the memory 260 and/or in the navigation database 350 in response to requests from the rendering module 362, the sensor data module 366, and/or other applications or modules implemented on the mobile device 120.

The data access module 368 of the mobile device can be configured to request the position of the mobile device 120 from the position determination module 370 in response to a request from the request processing module 372 and to use the location of the mobile device to access the map data for the indoor environment.

The request processing module 372 can be configured to receive requests for navigation and/or 3D map data for an indoor environment. The request processing module 372 can be configured to receive requests for navigation data and/or 3D map data for an indoor environment from an application on the mobile device 120. For example, a navigation data running on the mobile device 120 can be configured to request navigation data, 3D map data, and/or representations of the current position of the mobile device 120 within the indoor environment from the request processing module 372.

The navigation database 350 can be used to store customization information that the rendering module 362 can apply to 3D models derived from a 2D map of an indoor environment. The customization information can be collected by the model configuration module 364 and/or received from the navigation server 125 and stored in the navigation database 350. The navigation database 350 can also be configured to store 2D maps of indoor environments and well as 3D models generated based on the maps of the indoor environment. The navigation database can be organized to allow the data access module 368 of mobile device 120 to retrieve 2D maps, 3D models, and/or customization information associated with a particular indoor environment. For example, navigation database can be configured to associate the indoor environment with an address, a set of geographic coordinates, a polygon defining the geographic area covered by the indoor environment, and/or other information, such as a name of the indoor environment, that can be used to uniquely identify the indoor environment. The position of the mobile device can be used to determine in which indoor environment the mobile device 120 is located.

The position determination module 370 can be configured to determine the position of the mobile device 120 within an indoor environment and/or in an outdoor environment. In an indoor environment, the position determination module 370 can be configured to obtain measurements of signals from a plurality of wireless access points 115 to estimate the location of the mobile device 120 within an indoor environment in various ways. The position determination module 370 can be configured to determine the position of the mobile device 120 using signals from wireless access points 115 to determine the position of the mobile device 120 within an indoor environment. For example, the position determination module 370 can be configured to perform trilateration using signal measurements (e.g., RSSI (received signal strength indication), RTT (round-trip time)), time of arrival (TOA), and/or disambiguate between multiple possible disambiguation regions (e.g., floors) within an indoor environment, e.g., using RSSI and/or RTT measurements and known locations of the wireless access points 115 and/or wireless base stations 140. The position determination module 370 can also be configured to determine the position of the mobile device 120 using signals received from a Satellite Positioning System receiver associated with the mobile device 120 (e.g., associated with communications controller 250) to determine the position of the mobile device 120 when outdoors and a line of site to a sufficient number of satellites from one or more SPS constellations.

The position determination module 370 can also be configured to provide information to the location server 150 that the location server 150 can use to determine the location of the mobile device 120 and/or that the location server 150 can use to provide assistance data to the mobile device 120 that the mobile device 120 can use to determine the location of the mobile device 120. For example, location server 150 can send assistance data to the mobile device 120 that the mobile device 120 can use to acquire signals from satellites from one or more SPS constellations. The location server 150 can also be configured to provide the position determination module 370 of the mobile device 120 with an almanac of wireless access points 115 and/or base stations 140. The position determination module 370 can use the information included in the almanac to identify wireless access points 115 and/or base stations 140 proximate to the mobile device 120 and to use signals from nearby wireless access points 115 and/or base stations 140 to determine the position of the mobile device 120.

Figure 4:
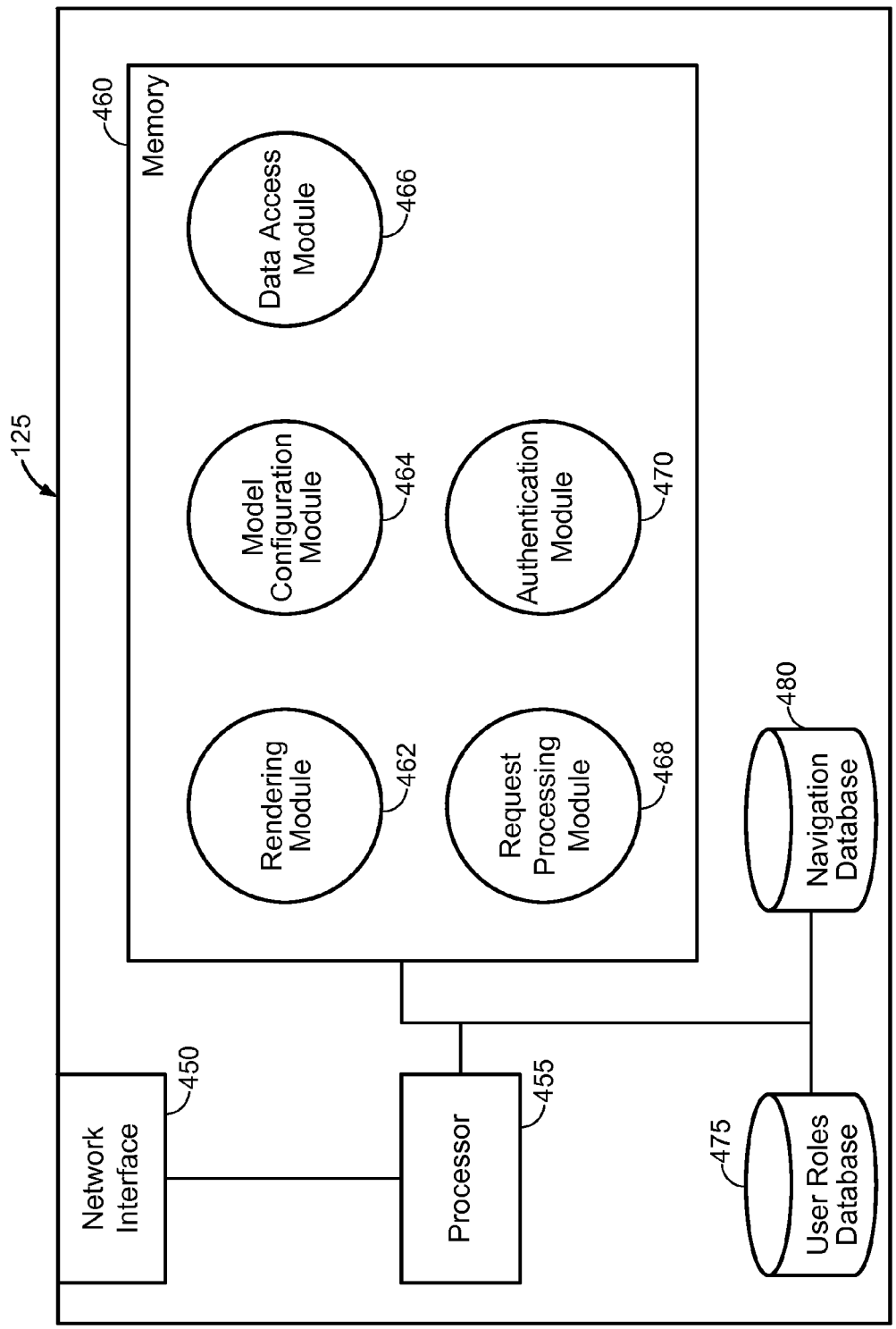
FIG. 4 is a functional block diagram of a computer system that can be used to implement the navigation server illustrated in FIG. 1.

FIG. 4 is a functional block diagram of a computer system that can be used to implement the navigation server 125 illustrated in FIG. 1. The navigation server 125 can include a processor 455, a network interface 450, a memory 460, a navigation database 480, and a user roles database 475. The navigation server 125 can also include functional modules that can be implemented as processor executable software code stored in memory 460. The functional modules illustrated in FIG. 4 can alternatively be stored either in part or in whole in a different computer-readable memory. For example, the functional modules may be stored in a removable computer-readable medium associated with the navigation server 125, such as a flash memory, a SD-Card, or other type of removable memory. The functional modules illustrated in FIG. 4 can also be implemented in part or in whole in firmware and/or hardware. An example implementation of the navigation server 125 includes a rendering module 462, a model configuration module 464, a data access module 466, and a request processing module 468.

The processor 455 can be configured to execute software code stored in the memory 460. For example, the processor 455 can be configured to execute the software code associated with the rendering module 462, the model configuration module 464, the data access module 466, and the request processing module 468. The processor 455 can also be configured to execute other software code used by the navigation server 125, such as operating system components, software drivers for peripheral devices, and/or other software code that may be executed by the navigation server 125 but the description of which is not required to understand the operation of the systems and methods disclosed herein.

The network interface 450 can be configured to provide bidirectional wireless and/or wired network communications to the navigation server 125. The network interface 450 can be configured to allow the navigation server 125 to communicate with mobile devices 120 via one or more intermediate networks, such as the Internet, a wireless network service provider's core network, one or more wireless local area networks (WLANs), and/or other types of network. The network communications between the network interface 450 of the navigation server 125 and the mobile devices 120 may be routed through one or more other network elements, such as wireless access point 115 or base station 140.

The memory 460 can comprise volatile and/or persistent memory for storing data used by various components of the navigation server 125. The memory 460 can be used to store processor-executable program code for one or more of the processors included in the navigation server 125, such as processor 455.

The rendering module 462 can be configured to operate similarly to the rendering module 362 of the mobile device 120. The rendering module 462 can be configured to render a 3D model of an indoor environment based on a 2D map of the environment. The rendering module 462 can be configured to selectively render components of the indoor environment with varying levels of transparency and can be configured to render portions of the indoor environment as opaque. Rendering components of the indoor environment as semi-transparent can provide the user with a 3D view of the indoor environment that is less claustrophobic than a view where the components of the indoor environment are rendered as completely opaque. FIGS. 12A, 12B, and 12C provide example renderings that illustrate the use of different transparency levels. Rendering components of the indoor environment as semi-transparent may provide the user of the mobile device 120 with a better understanding of the layout of the indoor environment surrounding the user than a rendering where all of the components of 3D model of the indoor environment are all rendered as completely opaque.

The navigation server 125 can be configured to provide pre-rendered 3D models to the mobile device 120 and/or can be configured to provide 3D representations of the current location of a mobile device based on location information and/or orientation information received from the mobile device 120. Rendering of the 3D models and/or 3D representations can be performed by the navigation server 125 where the mobile device 120 does not have sufficient resources to generate the 3D model of the indoor environment from a 2D map of the environment. For example, generating of the 3D model of the indoor environment and/or representations of the current location of the mobile device may be performed on the navigation server 125 rather than the mobile device 120 to conserve limited processing power, memory, and/or battery life on the mobile device 120. Rendering the 3D models and/or 3D representations can be performed by the navigation server 125 where security is a concern. For example, the owner or manager of an indoor environment may not want to have a full 2D map of an indoor environment available to the public and would rather provide a pre-rendered 3D model of the indoor environment or provide 3D representations of the current location of a mobile device 120 to the mobile device rather than providing the 2D map to the mobile device. The rendering module 462 can be configured to render some portions of the indoor environment as semi-transparent and other components of the indoor environment as opaque based on a user security profile associated with the mobile device 120 for which the 3D model and/or 3D representations of the current location of the mobile device are being rendered.

The rendering module 462 can be configured analyze the 2D map of the indoor environment and to derive a 3D model of the indoor environment from the 2D map. The rendering module 462 can be configured to identify basic structural components of the indoor environment, such as walls, doors, windows, floors and ceilings. The rendering module 462 can also be configured to make some basic assumptions about the structure of the indoor environment if the 2D map of the indoor environment does not provide information to the contrary. The rendering module 462 can be configured to make the assumption that the floors and ceilings are parallel to the ground unless otherwise specified by the 2D map. For example, the rendering module 462 could be configured to recognize that the indoor environment includes a ramp at a particular location and could render the floor in that portion of the floor to be sloped rather than perpendicular to a ground plane. The rendering module 462 can also be configured to assume that the walls and doors are placed perpendicular to the floor unless otherwise specified by the 2D map.

The rendering module 462 can also be configured to access customization information associated with the map of the indoor environment from the navigation database 480. The rendering module 462 can be configured to request customization information from the mobile device 120. The customization information can be used to define one or more attributes to be applied to the 3D model derived from the 2D map of the indoor environment. The customization information can be received from a user of the mobile device and/or may be associated with the map of the 2D environment. For example, the rendering module 462 can be configured to accept customization information provided by a user of the mobile device (e.g., via the model configuration module 364 described above). Customization information can also be associated with a 2D map of an indoor environment. For example, an owner or manager of an indoor environment, such as an office building, a shopping mall, or airport, could provide customization information along with a 2D map of the environment. The customization information can be used when deriving a 3D model of the indoor environment from the 2D map. For example, the customization information can associate colors and/or textures with particular components of the indoor environment. The colors and/or textures associated with the components of the indoor environment can be similar to those actually used in the indoor environment, which would enable the rendering module 462 to generate a 3D model of the indoor environment that provides a more accurate representation of the actual indoor environment.

Like the model configuration module 364 provided by the mobile device 120, the model configuration module 464 can allow users to provide customization information to be applied to a 3D model of an indoor environment generated by the rendering module 462. For example, the model configuration module 464 can be configured to allow owners and/or managers of an indoor environment to provide customization information that can be applied to a 3D model of an indoor environment generated by the rendering module 462. The configuration module can provide a user interface that allows a user to select colors and/or textures to be applied to components of a model of an indoor environment and/or to designate portions of the indoor environment to be rendered as opaque. The user interface can be configured to display the 2D map of the indoor environment and to allow the user to select components to which specific textures and/or colors should be applied. The user interface can also be configured to allow the user to designate portions of the indoor environment that should be rendered as opaque in the 3D model and/or to associate user security profiles with certain portions of the indoor environment in which the rendering module 462 selectively renders portions of the indoor environment as semi-transparent or opaque based on a user's security profile. The user security profiles can be stored in the user roles database 475. In one example, an airport management authority could provide a first security profile for members of the public and a second profile for security officers at the airport. The first security profile could indicate that portions of the airport that the members of the public do not have access to be rendered as opaque when a 3D model of the airport is generated for users associated with the first security profile. The second security profile associated with security officers and other trusted airport employees could indicate that the indoor environment of the airport can be generated as semi-transparent to allow these users to have a view into secure areas that would otherwise be unavailable to members of the public. In another example, a business could provide visitors to the business's office building with a visitor security profile that provides the ability to see into conference rooms, restroom facilities, and/or other portions of the building to which the visitors should have access while rendering walls, floors, ceilings, bordering other portions of the building as opaque to prevent the visitors from obtaining information about the layout of portions of the building to which the visitors do not have access. The business could provide different security profile levels for employees of the business to allow them to be able to into see different portions of the 3D model of the indoor environment, by selectively rendering certain components of the 3D model as transparent and other components of the 3D model as opaque.

The data access module 466 can be configured to access data stored in the memory 460 of the navigation server 125, the user roles database 475, and/or in the navigation database

480. The data access module 466 can be configured to access data stored in or to store data in the memory 460, the user roles database 475, and/or in the navigation database 480 in response to requests from the rendering module 462, model configuration module 464, and/or other applications or modules implemented on the navigation server 125. The navigation database 480 can be used to store customization information that the rendering module 462 can apply to 3D models derived from a 2D map of an indoor environment. The customization information can be collected by the model configuration module 464 and stored in the navigation database 480. The navigation database 480 can also be configured to store 2D maps of indoor environments and well as 3D models derived from the maps of the indoor environment. The navigation database can be organized to allow the data access module 466 of the navigation server 125 to retrieve 2D maps, 3D models, and/or customization information associated with a particular indoor environment. For example, navigation database can be configured to associate the indoor environment with an address, a set of geographic coordinates, a polygon defining the geographic area covered by the indoor environment, and/or other information, such as a name of the indoor environment, that can be used to uniquely identify the indoor environment. Which indoor environment is being referenced can be determined based on the location of the mobile device 120.

The user roles database 475 can be configured to store user security profile information associated with mobile users and security requirements associated with 2D environments. The user roles database 475 can also be used to store user authentication information that can be used to control access to the information stored in the navigation database 480. For example, the user roles database 475 can be used to authentication information associated with owners and/or managers of an indoor environment. The authentication information can be used to determine whether a user is authorized to access and/or update content associated with a particular indoor environment. The authentication module 470 can be configured to provide a user interface that allows user to provide their authentication information and to verify that the provided authentication information matches that stored in the user roles database 475.

The request processing module 468 can be configured to receive requests for information from a mobile device 120 and to send requested data to the mobile device 120. For example, the request processing module 468 can be configured to receive requests for 2D map information, customization information, 3D models associated with an indoor environment, and/or 3D representations of the current location of the mobile device within the indoor environment. The request processing module 468 can be configured to request information from the data access module 466 and/or the rendering module 462 if the requested information is not available in the navigation database 480.

Figure 5:
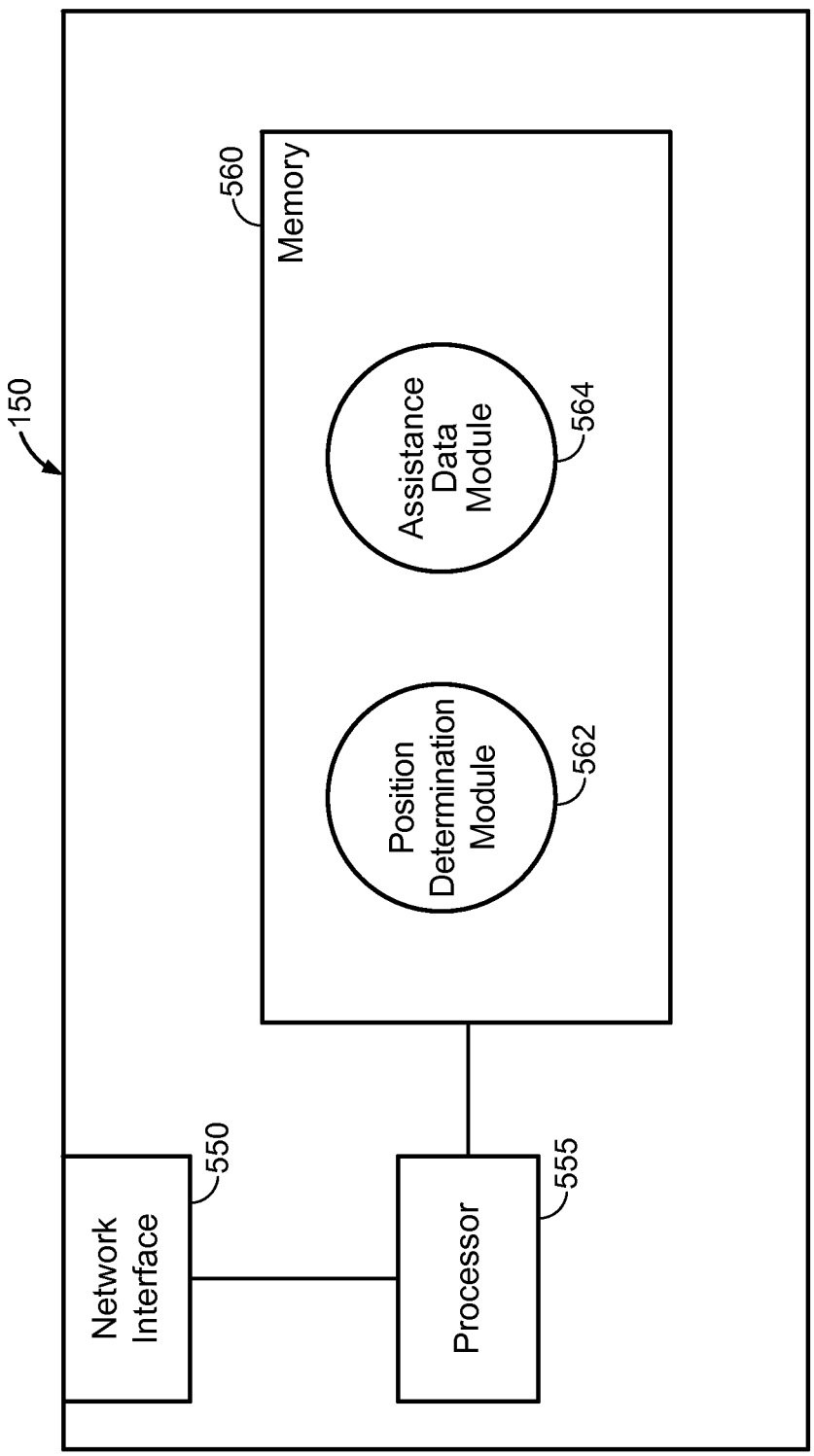
FIG. 5 is a functional block diagram of a computer system that can be used to implement the navigation server illustrated in FIG. 1.

FIG. 5 is a functional block diagram of a computer system that can be used to implement the location server 150 illustrated in FIG. 1. In the examples provided in the figures, the navigation server 125 and the location server 150 are illustrated as separate servers. However, in alternative implementations, some or all of the functionality of the navigation server 125 and the location server 150 may be implemented on the same server.

The location server 150 can include a processor 555, a network interface 550, and a memory 560. The location server 150 can also include functional modules that can be implemented as processor executable software code stored in memory 560. The functional modules illustrated in FIG. 5 can alternatively be stored either in part or in whole in a different computer-readable memory. For example, the functional modules may be stored in a removable computer-readable medium associated with the location server 150, such as a flash memory, a SD-Card, or other type of removable memory. The functional modules illustrated in FIG. 5 can also be implemented in part or in whole in firmware and/or hardware. The navigation server 125 can include a position determination module 562 and an assistance data module 564.

The processor 555 can be configured to execute software code stored in the memory 560. For example, the processor 555 can be configured to execute the software code associated with the position determination module 562 and the assistance data module 564. The processor 555 can also be configured to execute other software code used by the location server 150, such as operating system components, software drivers for peripheral devices, and/or other software code that may be executed by the location server 150 but the description of which is not required to understand the operation of the systems and methods disclosed herein.

The network interface 550 can be configured to provide bidirectional wireless and/or wired network communications to the location server 150. The network interface 550 can be configured to allow the location server 150 to communicate with mobile devices 120 via one or more intermediate networks, such as the Internet, a wireless network service provider's core network, one or more wireless local area networks (WLANs), and/or other types of network. The network communications between the network interface 550 of the location server 150 and the mobile devices 120 may be routed through one or more other network elements, such as wireless access point 115 or base station 140.

The memory 560 can comprise volatile and/or persistent memory for storing data used by various components of the location server 150. The memory 460 can be used to store processor-executable program code for one or more of the processors included in the location server 150, such as processor 555.

The position determination module 562 can be configured to provide location based services to mobile devices 120. For example, the position determination module 562 can be configured to determine the position of a mobile device 120 and/or provide assistance data to the mobile device that can be used to determine the position of the mobile device within an indoor environment and/or in an outdoor environment. For determining the position of a mobile device 120 within an indoor environment, the position determination module 562 can be configured to obtain from the mobile device 120 measurements of signals from a plurality of wireless access points 115 to estimate the location of the mobile device 120 within an indoor environment in various techniques, such as RSSI, RTT, TOA, and/or other techniques. The position determination module 562 can also be configured to determine the position of the mobile device 120 using signals received from a Satellite Positioning System receiver associated with the mobile device 120 (e.g., associated with communications controller 250) to determine the position of the mobile device 120 when outdoors and a line of site to a sufficient number of satellites from one or more SPS constellations.

The assistance data module 564 can be configured to identify assistance data that the mobile device 120 can use to determine the location of the mobile device. The assistance data module 564 can be configured to provide the mobile device 120 with an almanac of wireless access points 115 and/or base stations 140 which may be proximate to the mobile device 120. The mobile device 120 can use this information to identify wireless access points 115 and/or base stations 140 that may be proximate to the mobile device 120 and to use signals from nearby wireless access points 115 and/or base stations 140 to determine the position of the mobile device 120.

Figure 6:
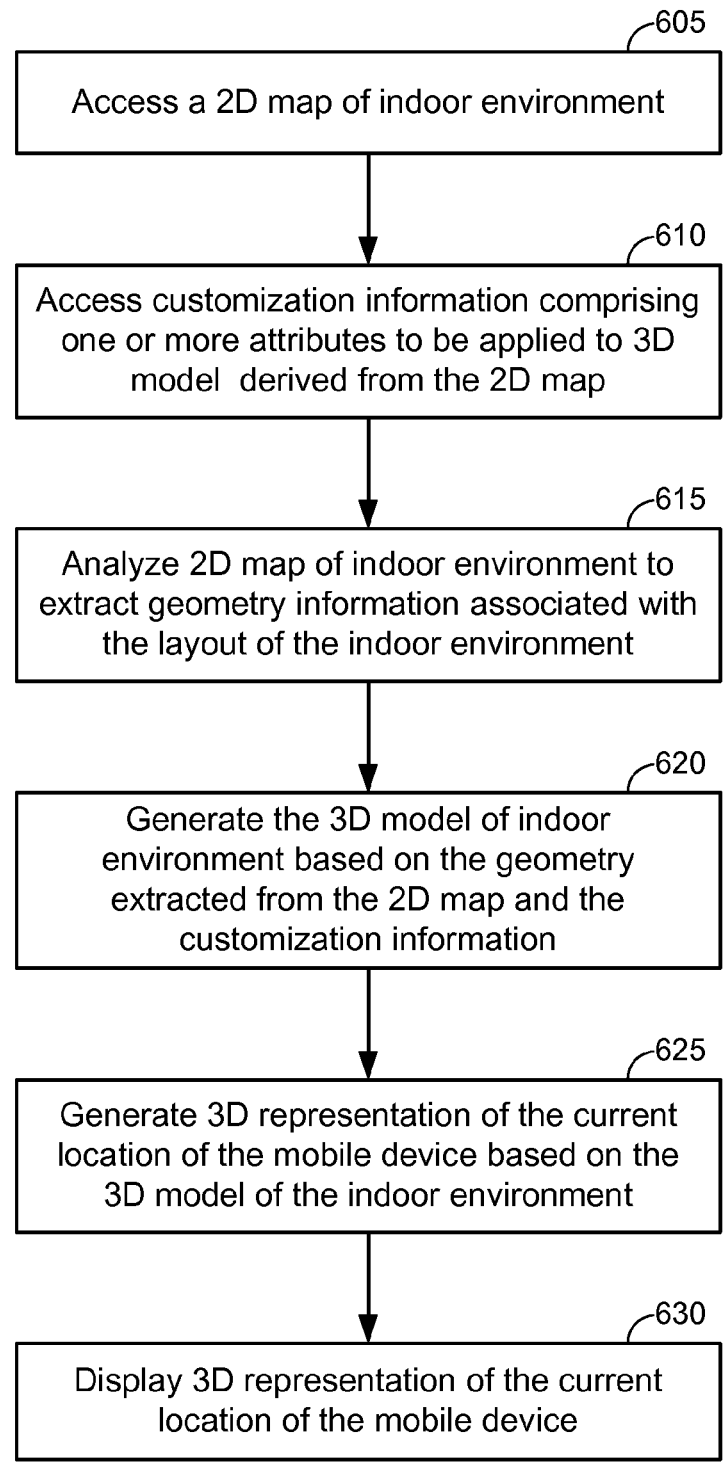
FIG. 6 is a block flow diagram of a process for providing improved navigation through an indoor environment using a mobile device.

FIG. 6 is a block flow diagram of a process for providing improved navigation through an indoor environment using a mobile device. The process illustrated in FIG. 6 can be implemented by the mobile device 120. However, some or all of the stages of the process illustrated in FIG. 6 can be implemented either in whole or in part by the navigation server 125 and/or the location server 150. For example, the navigation server 125 could be configured to generate the 3D model of the indoor environment and/or generate the 3D representation of the current location of the mobile device instead of the mobile device 120 performing those steps.

The process can begin with accessing a two-dimensional (2D) map of the indoor environment (stage 605). The mobile device 120 can access a 2D map of an indoor environment. The 2D map of the indoor environment can be stored in the navigation database 350. The mobile device 120 can be configured to receive the 2D map from the navigation server 125 and can be configured to store the received 2D map in the navigation database 350. The data access module 368 of the mobile device can be configured to request the 2D map of the indoor environment from the navigation server 125 if the 2D map is not available in the navigation database 350. The navigation database 480 can organize the map data stored therein based on the location of the indoor environment. The data access module 368 of the mobile device can be configured to request the position of the mobile device 120 from the position determination module 370 in response to a request from the request processing module 372 and to use the location of the mobile device to access the map data for the indoor environment. The mobile device 120 can be configured to enter into stage 605 of the process illustrated in FIG. 6 in response to a request from a navigation application on the mobile device 120. For example, a user of the mobile device 120 can launch a navigation application on the mobile device 120 and the navigation application can send a request to the request processing module 372 for 3D map data for the indoor environment.

Customization information comprising one or more attributes to be applied to a three-dimensional (3D) model of the indoor environment derived from the 2D map of the indoor environment can also be accessed by the mobile device 120 (stage 610). The customization information can be stored in the navigation database 350. At least a portion of the customization information may have been provided by a user of the mobile device to allow the user of the mobile device to customize the user experience. For example, the customization information can include color and/or texture information to be applied to the 3D model as well as transparency level preferences provided by the user of the mobile device 120. At least a portion of the customization information may also have been provided with the map of the 2D environment. For example, an owner or manager of an indoor environment may have provided color and/or texture information to be applied to the 3D model as well as transparency settings associated with the indoor environment. The customization information can also include security profile information associated with the 2D environment that places limits on which users may see which parts of an indoor environment. The rendering module 362 of the mobile device 120 can be configured to selectively render components of the indoor environment as opaque (regardless of the user preferences selected by the user of the mobile device) based on user profile information associated with the user of the mobile device 120.

The 2D map of the indoor environment can then be analyzed to extract geometry information associated with the layout of the indoor environment (stage 615). The rendering module 362 of the mobile device 120 can extract the geometry information from the 2D representation of the indoor environment. The 2D map of the indoor environment can be provided in various electronic formats that can represent the components of the indoor environment. In an implementation, the 2D map can comprise geometric information embedded in an XML file that describes the layout of the indoor environment. In an implementation, the 2D map can comprise lines and/or as a set of polygons that represent the geometry of the components of the indoor environment. In one implementation, the components of the indoor environment can be represented as a series of nodes or points. Two nodes may be connected by an edge, and a node may be included in multiple edges. A component of the indoor environment, such as a door, may comprise multiple nodes and/or edges. The 2D map of the indoor environment can be defined in a local set of coordinates representing the locations of the nodes relative to one another. For example, the components of a floor of an indoor environment may be represented as a set of X and Y coordinates. Multiple floor indoor environments can be represented as a series of 2D maps, where each 2D map represents a floor of the indoor environment. For multiple floor indoor environments, a Z coordinate may also be introduced that can represent the floor that a particular 2D map represents. A 2D map can also be defined using a global coordinate system. For example, the locations of the nodes in a 2D map may be represented as a set of latitude and longitude values. In some implementations, the geometry information included in the 2D map information can be extracted from a blueprint of the indoor environment or a scan of the indoor environment using image analysis algorithms. The image analysis algorithms can be configured to detect and extract lines and curves from the blueprint or photograph of the indoor environment and to construct a 2D map of the indoor environment.

A 3D model of the indoor environment can then be generated based on the geometry extracted from the 2D map of the indoor environment and the customization information (stage 6201. Structural components of the indoor environment, such as walls, doors, windows, floors and ceilings can be identified in the 2D map information. Basic assumptions about the structure of the indoor environment can also be made if the 2D map information does not provide information to the contrary. The floors and ceilings can be assumed to be parallel unless otherwise specified by the 2D map. For example, a ramp, stairs, a sunken or raised portion of the floor and/or other structural component of the indoor environment may be identified that may indicate that the floor and the ceiling might not be parallel in a particular part of the indoor environment. The walls and/or doors can also be assumed to be placed perpendicularly to the floor unless the 2D map data indicates that they are placed differently within the indoor environment. The customization information accessed in stage 610 can also be applied to the 3D model of the indoor environment. The customization information can be provided by the owner or manager of the indoor environment and may also include information provided by the user of the mobile device to customize the user's experience. The customization information can be used to determine which components of the indoor environment may be rendered as semi-transparent and whether any components of the indoor environment should be rendered as opaque. The customization information may also include textures and/or colors to be applied to the 3D model of the indoor environment. The customization information can also include a route through the indoor environment, and different colors, textures, and transparency levels can be applied to components of the indoor environment along the route.

A 3D representation of the current location of the mobile device based on the 3D model of the indoor environment can then be generated (stage 625) and displayed on the display 225 of the mobile device 120 (stage 630). The 3D representation of the current location of the mobile device can provide a field of view of the mobile device 120 within the indoor environment. The 3D representation can be based on the orientation of the mobile device 120 relative to the current location of the mobile device within the indoor environment. For example, if the user holds the mobile device facing a first direction, the 3D representation of current position can represent a field of view of the indoor environment looking in that first direction, and if the user holds the mobile device facing a second direction, the 3D representation of the current position can represent a field of view of the indoor environment looking in that second direction. The mobile device 120 can be configured to track changes in the location of the mobile device 120 within the indoor environment and to update the 3D representation of the current location of the mobile device accordingly so that the user is provided with an updated view of the user's location as the user moves through the indoor environment. The 3D representation of the mobile device can also be based at least in part on transparency settings associated with the 3D model of the indoor environment. For example, certain components of the indoor environment may be rendered as semi-transparent, and the level of transparency applied to these components when rendering the 3D representation of the current position of the mobile device can vary based on the distance that those components are from the current position of the mobile device. In some implementations, components of the indoor environment that are closer to the mobile device can be rendered as more transparent than components of the indoor environment that are farther from the current position of the mobile device. This approach can provide the user of the mobile device with more details of the components of the indoor environment that are closest to the user. This approach can also help to reducing visual clutter by rendering components of the indoor environment farther from the current position of the mobile device (and thus, the user of the mobile device) to be less transparent than those closer to current position of the mobile device 120.

In some instances, a 3D model may have already been generated for a particular indoor environment and stored in the navigation database 350 and the method illustrated in FIG. 6 can be modified accordingly. The mobile device 120 can be configured to access the 3D model of the indoor environment and to apply any customization information associated with indoor environment to the 3D model that has not already been applied to the 3D model. Where the 3D model of the indoor environment is available, stages 605 and 615 of the process illustrated in FIG. 6 may be skipped and the remaining stages of the process completed as described above.

FIG. 7 is a block flow diagram of a process for providing improved navigation through an indoor environment using a mobile device. The process illustrated in FIG. 7 can be implemented by the mobile device 120. However, some or all of the stages of the process illustrated in FIG. 7 can be implemented either in whole or in part by the navigation server 125 and/or the location server 150. In contrast with the process illustrated in FIG. 6, in the process illustrated in FIG. 7, the mobile device 120 is configured to receive a pre-rendered 3D model of an indoor environment from the navigation server 125. The mobile device 120 can be configured to render 3D models on the mobile device 120 as illustrated in FIG. 6 and can also be configured to receive pre-rendered 3D models from the navigation server 125 as illustrated in FIG. 7.

The process begins with the mobile device 120 receiving a 3D model of an indoor environment from the navigation server 125 (stage 705). The mobile device 120 can be configured to send a request to the navigation server 125 for the 3D model and to receive the 3D model from the navigation server 125 in response to the request. The mobile device 120 can be configured to send the request to the navigation server 125 in response to request for navigation data from an application running on the mobile device 120. The mobile device 120 can also be configured to receive the 3D model from the navigation server 125 in response to the navigation server 125 pushing the 3D model to the navigation server. For example, the navigation server 125 can be configured to push the 3D model of the indoor environment to the mobile device 120 when the mobile device 120 enters or approaches within a predetermined distance of the indoor environment. The distance of the mobile device 120 from the indoor environment could be determined by measuring signals transmitted between one or more wireless access points 115 included in the indoor environment and the mobile device 120.

Customization information can also be accessed by the mobile device 120 (stage 710) and the customization information can be applied to the 3D model received from the navigation server 125 (stage 715). The navigation server 125 can be configured to apply customization information to the 3D model that has been received from the mobile device. In some implementations, the mobile device 120 can be configured to access customization information stored in the navigation database 350. The customization information may be provided by a user of the mobile device 120 and can be stored in the navigation database 350 by the model configuration module 364. The customization information can include colors and/or textures to be applied to components of the indoor environment, transparency level preferences, and/or route information. The mobile device can be configured to apply the customization information provided by the user to further customize the 3D model provided by the navigation server 125 as preferred by the user of the mobile device 120. In some implementations, the mobile device can be configured to send customization information provided by a user of the mobile device 120 to the navigation server 125 when sending the request for the 3D model of the indoor environment to the navigation server 125 in stage 705, and the navigation server can be configured to apply the customization information when rendering the 3D model of the indoor environment requested by the mobile device 120.

A 3D representation of the current location of the mobile device based on the 3D model of the indoor environment can be generated (stage 720) and the 3D representation can be displayed by the mobile device 120 (stage 725). The mobile device 120 can be configured to determine the location of the mobile device 120 within the indoor environment. The mobile device 120 can also be configured to receive assistance data from the location server 150 that the mobile device 120 can use to determine the location of the mobile device 120 within the indoor environment. The mobile device can also be configured to request that the location server 150 determine the location of the mobile device 120, and the mobile device 120 can be configured to measure signals between the mobile device 120 and the wireless access points 115 and/or the base station 140 and send the measurements to the location server 150 so that the location server 150 can determine the current location of the mobile device 120. Based on the location within the indoor environment, a 3D representation of the current location of the mobile device 120 can be displayed on the display 225 of the mobile device. The 3d representation of the current location of the mobile device can created using the 3D model of the indoor environment. The 3D representation of the current location of the mobile device can also take into account the orientation of the mobile device 120 relative to the current location of the mobile device within the indoor environment (as described above with regard to stage 625 of the process illustrated in The mobile device 120 can also be configured to track changes in the location of the mobile device 120 within the indoor environment and to update the 3D representation of the current location of the mobile device accordingly so that the user is provided with an updated view of the user's location as the user moves through the indoor environment. The 3D representation of the mobile device can also be based at least in part on transparency settings associated with the 3D model of the indoor of the environment.

FIG. 8 is a block flow diagram of a process for generating a 3D model of an indoor environment from a 2D map of the indoor environment for a mobile device 120. The process illustrated in FIG. 8 can be implemented by the navigation server 125. However, some or all of the stages of the process illustrated in FIG. 8 can be implemented either in whole or in part by the mobile device 120 and/or the location server 150.

The process can begin with two optional stages 805 and 810. In stage 805, a request for a 3D model of the indoor environment can be received from the mobile device 120. In some implementations, the mobile device 120 can request that the 3D model be transmitted to the mobile device 120 to assist with navigation through the indoor environment, and the mobile device 120 can be configured to generate 3D representations of the current location of the mobile device 120 based on the 3D model provided by the navigation server. In other implementations, the navigation server 125 can be configured to push the 3D model of the indoor environment to the mobile device 120 in response to mobile device 120 being detected near or within the indoor environment. The navigation server 125 can be configured to determine whether a particular mobile device 120 can support navigation activities using such a 3D model before pushing the 3D model to the mobile device 120.

Customization information to be applied to the 3D model of the indoor environment when generating the 3D representation of the indoor environment can also be optionally provided by the mobile device 120 (stage 810). In some implementations, stages 805 and 810 can also be combined and the request for the representation of the current location of the mobile device 120 can include the customization information. The customization information provided by the mobile device 120 can be received from a user of the mobile device to allow the user to customize the user experience. For example, the customization information can include color and/or texture information to be applied to the 3D model as well as transparency level preferences provided by the user of the mobile device 120. In some implementations, the mobile device 120 can be configured to apply the customization information to the 3D model received from the navigation server 125, and thus, the mobile device 120 does not send the customization information to the navigation server 125.

A 2D map of indoor environment can be accessed (stage 815). The navigation server 125 can be configured to access the navigation database 480 to access a 2D map of an indoor environment. The navigation server 125 can be configured to access the 2D map of the indoor environment in response to a request from the mobile device 120 for a 3D model of the indoor environment. The request from the mobile device 120 can include the location of the indoor environment or other information identifying the indoor environment. In some implementations, the navigation server 125 can be configured to push the 3D model of the indoor environment to the mobile device 120 in response to the mobile device entering or approaching within a predetermined distance of the indoor environment. The distance of the mobile device 120 from the indoor environment could be determined by measuring signals transmitted between one or more wireless access points 115 included in the indoor environment and the mobile device 120.

Customization information comprising one or more attributes to be applied to the 3D model of the indoor environment generated from the 2D map can also be accessed (stage 820). The customization information can be stored in the navigation database 480 of the navigation server 125. The customization information stored in the navigation database 480 can be provided by an owner or manager of an indoor environment. The customization information can be used to configure various attributes of the 3D model, including colors and/or textures to be applied to components of the indoor environment, transparency levels and/or opacity settings for components of the indoor environment, and other attributes of the 3D model. The customization information can also include security settings that depend on user security profiles associated with the indoor environment. In some implementations, the request for the 3D model received from the mobile device can include a user security profile, and the navigation server 125 can be configured to selectively render certain portions of the indoor environment as opaque based on the user security profile received from the mobile device 120.

The 2D map of the indoor environment can then be analyzed to extract geometry information associated with the layout of the indoor environment (stage 825). The rendering module 462 of the navigation server 125 can extract the geometry information from the 2D representation of the indoor environment. As described above, the 2D map of the indoor environment can be provided in various electronic formats that can represent the components of the indoor environment as lines and/or as a set of polygons that represent the geometry of the components of the indoor environment. The components of the indoor environment can be represented as a series of nodes or points and edges connecting nodes, and the location of the nodes can be represented in a local or global coordinates.

A 3D model of the indoor environment can be generated based on the geometry extracted from the 2D map of the indoor environment (stage 830). The navigation server 125 can be configured to perform similar steps as those described in stage 620 of the process illustrated in FIG. 6. Structural components of the indoor environment, such as walls, doors, windows, floors and ceilings can be identified in the 2D map information and basic assumptions about the structure of the indoor environment can be made based on the 2D map. The customization information accessed from the navigation database 480 can also be applied when rendering components of the indoor environment. The customization information can be used to determine which components of the indoor environment may be rendered as semi-transparent and whether any components of the indoor environment should be rendered as opaque. The customization information may also include textures and/or colors to be applied to the 3D model of the indoor environment.

The 3D model of the indoor environment can then be sent to the mobile device 120 (stage 835). The navigation server 125 can send the 3D model generated in stage 820 to the mobile device 120 via the network 110.

Figure 9:
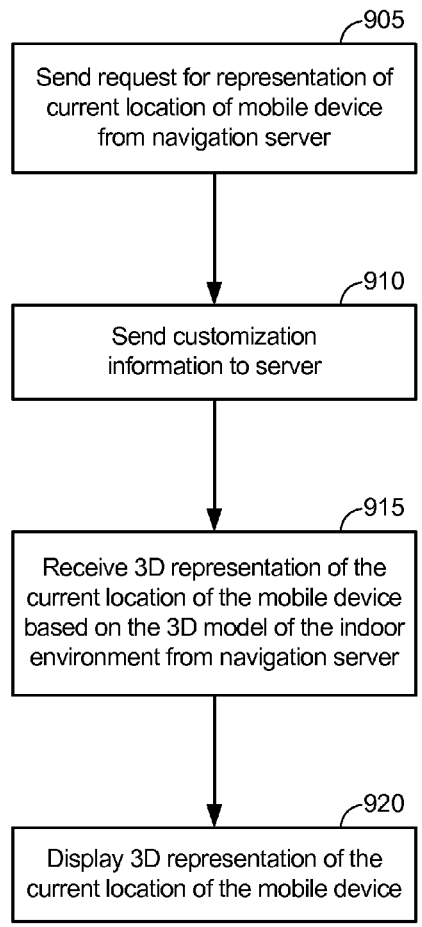
FIG. 9 is a block flow diagram of another process for providing improved navigation through an indoor environment using a mobile device.

FIG. 9 is a block flow diagram of a process for providing improved navigation through an indoor environment using a mobile device. The process illustrated in FIG. 7 can be implemented by the mobile device 120. However, some or all of the stages of the process illustrated in FIG. 7 can be implemented either in whole or in part by the navigation server 125 and/or the location server 150. In contrast with the process illustrated in FIGS. 6 and 7, in the process illustrated in FIG. 9, the mobile device 120 is configured to receive a 3D representation of the current location of the mobile device of an indoor environment from the navigation server 125. The mobile device 120 can be configured to render 3D models on the mobile device 120 as illustrated in FIG. 6 and can also be configured to receive pre-rendered 3D models from the navigation server 125 as illustrated in FIG. 7.

A request can be sent to the navigation server 125 for a representation of current location of mobile device 120 (stage 905). The 3D representation of the current location of the mobile device 120 can provide a field of view of the indoor environment based on the current position of the mobile device in the indoor environment. The request can include the current position of the mobile device and the direction and/or orientation of the mobile device relative to the indoor environment. The navigation server 125 can use this information to create a field of view into a 3D model of the indoor environment and send that 3D representation of the current location of the mobile device to the mobile device 120.

Customization information can also be accessed and sent to the navigation server 125 (stage 910). The customization information can be stored in the navigation database 350 of the mobile device and can define attributes that can be applied to the 3D model of the indoor environment by the navigation server 125. The customization information can also be sent with the request in stage 910.

In some implementations, stages 905 and 910 are optional, and the navigation server 125 can be configured to push a 3D representation of the current location of the mobile device 120 to the mobile device 120. In such an implementation, the navigation server 125 can be configured to request the location of the mobile device 120 from the mobile device 120 and/or from the location server 150.

A 3D representation of the current position of the mobile device in the indoor environment can then be received from the navigation server 125 (stage 915) and the 3D representation can be displayed on the display 225 of the mobile device 120 (stage 920).

Figure 10:
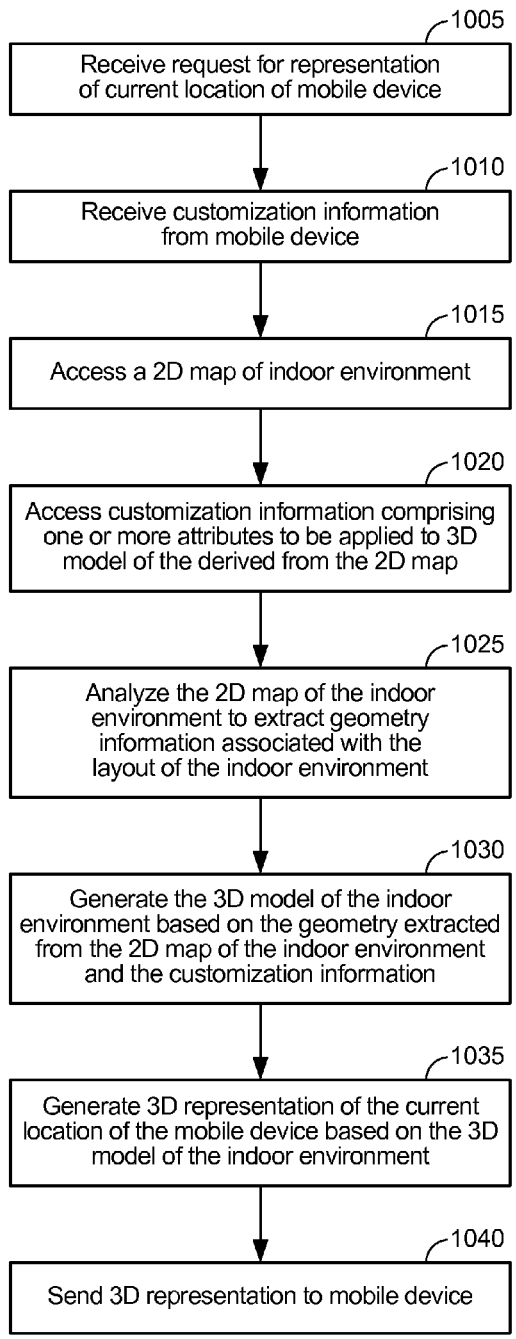
FIG. 10 is a block flow diagram of a process for generating a 3D model of an indoor environment from a 2D map of the indoor environment for a mobile device 120.

FIG. 10 is a block flow diagram of a process for generating representation of the currently location of a mobile device based on a 3D model of an indoor environment derived from a 2D map of the indoor environment. The process illustrated in FIG. 8 can be implemented by the navigation server 125. However, some or all of the stages of the process illustrated in FIG. 8 can be implemented either in whole or in part by the mobile device 120 and/or the location server 150. The process illustrated in FIG. 10 differs from the process illustrated in FIG. 8 in that the navigation server 125 provides the mobile device 120 with a 3D representation of the current location of the mobile device 120 within the indoor environment. In the process illustrated in FIG. 10, most of the processing is done on the navigation server 125. The mobile device 120 does not receive either the 2D map or 3D model of the indoor environment, nor does the mobile device 120 generate a 3D model of the indoor environment or generate a representation 3D representation of the current position of the mobile device 120.

The process can begin with two optional stages 1005 and 1010. In stage 1005, a request for a representation of the current location of a mobile device 120 can be received from the mobile device 120. In some implementations, the mobile device 120 can request that the 3D representation of the indoor environment be transmitted to the mobile device 120 to assist with navigation through the indoor environment. In other implementations, the navigation server 125 can be configured to push the 3D representation of the indoor environment to the mobile device 120 in response to mobile device 120 being detected near or within the indoor environment. Customization information to be applied to the 3D model of the indoor environment when generating the 3D representation of the indoor environment can also be optionally provided by the mobile device 120 (stage 1010). In some implementations, stages 1005 and 1010 can also be combined and the request for the representation of the current location of the mobile device 120 can include the customization information. The customization information provided by the mobile device 120 can be received from a user of the mobile device to allow the user to customize the user experience. For example, the customization information can include color and/or texture information to be applied to the 3D model as well as transparency level preferences provided by the user of the mobile device 120.

A 2D map of the indoor environment can then be accessed (stage 1015). Stage 1015 of this process is similar to that described above with respect to stage 815 of the method illustrated in FIG. 8. The navigation server 125 can be configured to access the 2D map of the indoor environment receive a request for the 3D representation of the current location of the indoor environment from the mobile device 120. The navigation server 125 can also be configured to push the 3D representation of the current position of the mobile device 120 in indoor environment to the mobile device 120 in response to the mobile device entering or approaching within a predetermined distance of the indoor environment.

Customization information comprising one or more attributes to be applied to the 3D model of the indoor environment generated from the 2D map can also be accessed (stage 1020). Stage 1020 of this process is similar to that described above with respect to stage 820 of the process illustrated in FIG. 8. The customization information can be stored in the navigation database 480 of the navigation server 125.

The 2D map of the indoor environment can then be analyzed to extract geometry information associated with the layout of the indoor environment (stage 1025). Stage 1025 of this process is similar to that described above with respect to stage 825 of the process illustrated in FIG. 8. The rendering module 462 of the navigation server 125 can extract the geometry information from the 2D representation of the indoor environment.

A 3D model of the indoor environment can be generated based on the geometry extracted from the 2D map of the indoor environment (stage 1030). Stage 1030 of this process is similar to that described above with respect to stage 830 of the process illustrated in FIG. 8 and similar to those described in stage 620 of the process illustrated in FIG. 6. Structural components of the indoor environment, such as walls, doors, windows, floors and ceilings can be identified in the 2D map information and basic assumptions about the structure of the indoor environment can be made based on the 2D map. The customization information accessed from the navigation database 480 can also be applied when rendering components of the indoor environment. The customization information can be used to determine which components of the indoor environment may be rendered as semi-transparent and whether any components of the indoor environment should be rendered as opaque. The customization information may also include textures and/or colors to be applied to the 3D model of the indoor environment.

A 3D representation of the current location of the mobile device based on the 3D model of the indoor environment can be generated (stage 1035) and the 3D representation can be send to the mobile device 120 (stage 1040). Stage 1035 of this process is similar to that described above with respect to stage 720 of the method illustrated in FIG. 7. The navigation server 125 can be configured to request the location of the mobile device 120 within the indoor environment from either the mobile device 120 or the location server 150. The 3D representation of the current location of the mobile device can created using the 3D model of the indoor environment generated in stage 1020. The 3D representation of the current location of the mobile device can take into account the orientation of the mobile device 120 relative to the current location of the mobile device within the indoor environment (if available). The navigation server 125 can also be configured to receive updates regarding the location of the mobile device 120 within the indoor environment, to generate an updated 3D representation of the current location of the mobile device 120, and to send the updated 3D representation to the mobile device 120, so that the user of the mobile device 120 is provided with an updated view of the user's location as the user moves through the indoor environment.

Other Considerations

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one" of indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method for providing improved navigation through an indoor environment using a mobile device, the method comprising:

accessing, using the mobile device, a two-dimensional (2D) map of the indoor environment;

accessing, using the mobile device, customization information comprising one or more attributes to be applied to a three-dimensional (3D) model of the indoor environment derived from the 2D map of the indoor environment, the customization information comprising a user profile associated with a user of the mobile device and security parameters associated with the indoor environment;

analyzing, using the mobile device, the 2D map of the indoor environment to extract geometry information associated with a layout of the indoor environment;

generating, using the mobile device, the 3D model of the indoor environment based on the geometry extracted from the 2D map of the indoor environment and the customization information;

generating, using the mobile device, a 3D representation of a current location of the mobile device within the indoor environment based on the 3D model of the indoor environment, wherein generating the 3D representation comprises selectively rendering portions of the 3D representation as opaque based on the user profile and the security parameters associated with the indoor environment; and displaying, using the mobile device, the 3D representation of the current location of the mobile device within the indoor environment on a display of the mobile device.

2. The method of claim 1 wherein displaying the 3D representation of the current location of the mobile device within the indoor environment on the display of the mobile device further comprises displaying a field of view in the 3D representation of the current location of the mobile device based at least in part on an orientation of the mobile device.

3. The method of claim 1 wherein the customization information includes transparency parameters, the transparency parameters defining levels of transparency to be associated with objects included in the 3D representation of the current location of the mobile device.

4. The method of claim 1 wherein the customization information includes at least one of texture information and color information, the texture information identifying one or more textures to be applied to objects included in the 3D representation and the color information identifying one or more colors to be applied to the objects included in the 3D representation.

5. The method of claim 1 wherein the customization information includes route information, the route information identifying a route through the indoor environment, and wherein generating the 3D representation of the current location of the mobile device within the indoor environment based on the 3D model of the indoor environment comprises rendering second portions of the 3D representation of the current location of the mobile device as partially transparent to emphasize the route through the indoor environment.

6. The method of claim 1, further comprising:
receiving the 2D map of the indoor environment from a location server associated with the mobile device.

7. The method of claim 1, further comprising:
receiving the 2D map of the indoor environment from a server associated with the indoor environment.

8. The method of claim 1, further comprising:
receiving the customization information at least in part from a server associated with the indoor environment.

9. The method of claim 1, further comprising:
receiving the customization information at least in part from the user of the mobile device.

10. An apparatus for providing improved navigation through an indoor environment using a mobile device, the apparatus comprising:
means for accessing a two-dimensional (2D) map of the indoor environment;
means for accessing customization information comprising one or more attributes to be applied to a three-dimensional (3D) model of the indoor environment derived from the 2D map of the indoor environment, the customization information comprising a user profile associated with a user of the mobile device and security parameters associated with the indoor environment;
means for analyzing the 2D map of the indoor environment to extract geometry information associated with a layout of the indoor environment;
means for generating the 3D model of the indoor environment based on the geometry extracted from the 2D map of the indoor environment and the customization information;
means for generating a 3D representation of a current location of the mobile device within the indoor environment based on the 3D model of the indoor environment, the means for generating the 3D representation further comprising means for selectively rendering portions of the 3D representation as opaque based on the user profile and the security parameters associated with the indoor environment; and
means for displaying the 3D representation of the current location of the mobile device within the indoor environment on a display of the mobile device.

11. The apparatus of claim 10 wherein the means for displaying the 3D representation of the current location of the mobile device within the indoor environment on the display of the mobile device comprises means for displaying a field of view in the 3D representation of the current location of the mobile device based at least in part on an orientation of the mobile device.

12. The apparatus of claim 10 wherein the customization information includes transparency parameters, the transparency parameters defining levels of transparency to be associated with objects included in the 3D representation of the current location of the mobile device.

13. The apparatus of claim 10 wherein the customization information includes at least one of texture information and color information, the texture information identifying one or more textures to be applied to objects included in the 3D representation and the color information identifying one or more colors to be applied to the objects included in the 3D representation.

14. The apparatus of claim 10 wherein the customization information includes route information, the route information identifying a route through the indoor environment, and wherein the means for generating the 3D representation of the current location of the mobile device within the indoor environment based on the 3D model of the indoor environment comprises means for rendering second portions of the 3D representation of the current location of the mobile device as partially transparent to emphasize the route through the indoor environment.

15. The apparatus of claim 10, further comprising:
means for receiving the 2D map of the indoor environment from a location server associated with the mobile device.

16. The apparatus of claim 10, further comprising:
means for receiving the 2D map of the indoor environment from a server associated with the indoor environment.

17. The apparatus of claim 10, further comprising:
means for receiving the customization information at least in part from a server associated with the indoor environment.

18. The apparatus of claim 10, further comprising:
means for receiving the customization information at least in part from the user of the mobile device.

19. A non-transitory computer-readable medium, having stored thereon computer-readable instructions for providing improved navigation through an indoor environment using a mobile device, comprising instructions configured to cause a computer to:

access a two-dimensional (2D) map of the indoor environment;

access customization information comprising one or more attributes to be applied to a three-dimensional (3D) model of the indoor environment derived from the 2D map of the indoor environment, the customization information comprising a user profile associated with a user of the mobile device and security parameters associated with the indoor environment;

analyze the 2D map of the indoor environment to extract geometry information associated with a layout of the indoor environment;

generate the 3D model of the indoor environment based on the geometry extracted from the 2D map of the indoor environment and the customization information;

generate a 3D representation of a current location of the mobile device within the indoor environment based on the 3D model of the indoor environment, the instructions to cause the computer to generate the 3D representation of the current location of the mobile device within the indoor environment based on the 3D model of the indoor environment comprise instructions to cause the computer to selectively render portions of the 3D representation as opaque based on the user profile and the security parameters associated with the indoor environment; and display the 3D representation of the current location of the mobile device within the indoor environment on a display of the mobile device.

20. The non-transitory computer-readable medium of claim 19 wherein the instructions configured to cause the computer to display the 3D representation of the current location of the mobile device within the indoor environment on the display of the mobile device further comprise instructions to cause the computer to display a field of view in the 3D representation of the current location of the mobile device based at least in part on an orientation of the mobile device.

21. The non-transitory computer-readable medium of claim 19 wherein the customization information includes transparency parameters, the transparency parameters defining levels of transparency to be associated with objects included in the 3D representation of the current location of the mobile device.

22. The non-transitory computer-readable medium of claim 19 wherein the customization information includes at least one of texture information and color information, the texture information identifying one or more textures to be applied to objects included in the 3D representation and the color information identifying one or more colors to be applied to the objects included in the 3D representation.

23. The non-transitory computer-readable medium of claim 19 wherein the customization information includes route information, the route information identifying a route through the indoor environment, and wherein the instructions to cause the computer to generate the 3D representation of the current location of the mobile device within the indoor environment based on the 3D model of the indoor environment comprise instructions to cause the computer to render second portions of the 3D representation of the current location of the mobile device as partially transparent to emphasize the route through the indoor environment.

24. The non-transitory computer-readable medium of claim 19, further comprising instructions to cause the computer to:

receive the 2D map of the indoor environment from a location server associated with the mobile device.

25. The non-transitory computer-readable medium of claim 19, further comprising instructions to cause the computer to:

receive the 2D map of the indoor environment from a server associated with the indoor environment.

26. The non-transitory computer-readable medium of claim 19, further comprising instructions to cause the computer to:

receive the customization information at least in part from a server associated with the indoor environment.

27. The non-transitory computer-readable medium of claim 19, further comprising instructions to cause the computer to:

receive the customization information at least in part from the user of the mobile device.

28. An apparatus for providing improved navigation through an indoor environment using a mobile device, the apparatus comprising:

a transceiver configured to transmit and receive data wirelessly;

a memory configured to store processor-executable program code; and a processor configured to:

access a two-dimensional (2D) map of the indoor environment;

access customization information comprising one or more attributes to be applied to a three-dimensional (3D) model of the indoor environment derived from the 2D map of the indoor environment, the customization information comprising a user profile associated with a user of the mobile device and security parameters associated with the indoor environment;

analyze the 2D map of the indoor environment to extract geometry information associated with a layout of the indoor environment;

generate the 3D model of the indoor environment based on the geometry extracted from the 2D map of the indoor environment and the customization information;

generate a 3D representation of a current location of the mobile device within the indoor environment based on the 3D model of the indoor environment, the processor being further configured to selectively render portions of the 3D representation as opaque based on the user profile and the security parameters associated with the indoor environment; and display the 3D representation of the current location of the mobile device within the indoor environment on a display of the mobile device.

29. The apparatus of claim 28 wherein the processor being configured to display the 3D representation of the current location of the mobile device within the indoor environment on the display of the mobile device is further configured to display a field of view in the 3D representation of the current location of the mobile device based at least in part on an orientation of the mobile device.

30. The apparatus of claim 28 wherein the customization information includes transparency parameters, the transparency parameters defining levels of transparency to be associated with objects included in the 3D representation of the current location of the mobile device.

31. The apparatus of claim 28 wherein the customization information includes at least one of texture information and color information, the texture information identifying one or more textures to be applied to objects included in the 3D representation and the color information identifying one or more colors to be applied to the objects included in the 3D representation.

32. The apparatus of claim 28 wherein the customization information includes route information, the route information identifying a route through the indoor environment, and wherein the processor being configured to generate the 3D representation of the current location of the mobile device within the indoor environment based on the 3D model of the indoor environment is further configured to render second portions of the 3D representation of the current location of the mobile device as partially transparent to emphasize the route through the indoor environment.

33. The apparatus of claim 28 wherein the processor is further configured to:
receive the 2D map of the indoor environment from a location server associated with the mobile device.

34. The apparatus of claim 28 wherein the processor is further configured to:
receive the 2D map of the indoor environment from a server associated with the indoor environment.

35. The apparatus of claim 28 wherein the processor is further configured to:
receive the customization information at least in part from a server associated with the indoor environment.

36. The apparatus of claim 28 wherein the processor is further configured to:
receive the customization information at least in part from the user of the mobile device.

37. A method for providing improved navigation information for an indoor environment to a mobile device, the method comprising:
accessing, using a computer system, a two-dimensional (2D) map of the indoor environment;
accessing, using the computer system, customization information comprising one or more attributes to be applied to a three-dimensional (3D) model of the indoor environment derived from the 2D map of the indoor environment, the customization information comprising a user profile associated with a user of the mobile device and security parameters associated with the indoor environment;
analyzing, using the computer system, the 2D map of the indoor environment to extract geometry information associated with a layout of the indoor environment;
generating, using the computer system, the 3D model of the indoor environment based on the geometry extracted from the 2D map of the indoor environment and the customization information;
generating, using the computer system, a 3D representation of a current location of the mobile device within the indoor environment based on the 3D model of the indoor environment, wherein generating the 3D representation comprises selectively rendering portions of the 3D representation as opaque based on the user profile and the security parameters associated with the indoor environment; and
sending, using the computer system, the 3D representation of the current location of the mobile device within the indoor environment to the mobile device.

38. The method of claim 37 further comprising:
determining that the mobile device has entered the indoor environment; and
sending the 3D representation to the mobile device responsive to determining that the mobile device has entered the indoor environment.

39. The method of claim 37 further comprising:
receiving a request for the 3D representation of the current location of the mobile device from the mobile device.

40. The method of claim 37 wherein the customization information includes transparency parameters, the transparency parameters defining levels of transparency to be associated with objects included in the 3D representation of the current location of the mobile device.

41. The method of claim 37 wherein the customization information includes at least one of texture information and color information, the texture information identifying one or more textures to be applied to objects included in the 3D representation and the color information identifying one or more colors to be applied to the objects included in the 3D representation.

42. The method of claim 37 wherein the customization information includes route information, the route information identifying a route through the indoor environment, and wherein generating the 3D representation of the current location of the mobile device within the indoor environment based on the 3D model of the indoor environment comprises rendering second portions of the 3D representation of the current location of the mobile device as partially transparent to emphasize the route through the indoor environment.

43. An apparatus for providing improved navigation information for an indoor environment to a mobile device, the apparatus comprising:
means for accessing a two-dimensional (2D) map of the indoor environment;
means for accessing customization information comprising one or more attributes to be applied to a three-dimensional (3D) model of the indoor environment derived from the 2D map of the indoor environment, the customization information comprising a user profile associated with a user of the mobile device and security parameters associated with the indoor environment;
means for analyzing the 2D map of the indoor environment to extract geometry information associated with a layout of the indoor environment;
means for generating the 3D model of the indoor environment based on the geometry extracted from the 2D map of the indoor environment and the customization information;
means for generating a 3D representation of a current location of the mobile device within the indoor environment based on the 3D model of the indoor environment, wherein the means for generating the 3D representation comprises means for selectively rendering portions of the 3D representation as opaque based on the user profile and the security parameters associated with the indoor environment; and
means for sending the 3D representation of the current location of the mobile device within the indoor environment to the mobile device.

44. The apparatus of claim 43 further comprising:
means for determining that the mobile device has entered the indoor environment; and
means for sending the 3D representation to the mobile device responsive to determining that the mobile device has entered the indoor environment.

45. The apparatus of claim 43 further comprising:
means for receiving a request for the 3D representation of the current location of the mobile device from the mobile device.

46. The apparatus of claim 43 wherein the customization information includes transparency parameters, the transparency parameters defining levels of transparency to be associated with objects included in the 3D representation of the current location of the mobile device.

47. The apparatus of claim 43 wherein the customization information includes at least one of texture information and color information, the texture information identifying one or more textures to be applied to objects included in the 3D representation and the color information identifying one or more colors to be applied to the objects included in the 3D representation.

48. The apparatus of claim 43 wherein the customization information includes route information, the route information identifying a route through the indoor environment, and wherein the means for generating the 3D representation of the current location of the mobile device within the indoor environment based on the 3D model of the indoor environment comprises means for rendering second portions of the 3D representation of the current location of the mobile device as partially transparent to emphasize the route through the indoor environment.

49. An apparatus for providing improved navigation information for an indoor environment to a mobile device, the apparatus comprising:
a transceiver configured to transmit and receive data wirelessly;
a memory configured to store processor-executable program code; and
a processor configured to:
access a two-dimensional (2D) map of the indoor environment;
access customization information comprising one or more attributes to be applied to a three-dimensional (3D) model of the indoor environment derived from the 2D map of the indoor environment, the customization information comprising a user profile associated with a user of the mobile device and security parameters associated with the indoor environment;
analyze the 2D map of the indoor environment to extract geometry information associated with a layout of the indoor environment;
generate the 3D model of the indoor environment based on the geometry extracted from the 2D map of the indoor environment and the customization information;
generate a 3D representation of a current location of the mobile device within the indoor environment based on the 3D model of the indoor environment, the processor being configured to selectively render portions of the 3D representation as opaque based on the user profile and the security parameters associated with the indoor environment; and
send the 3D representation of the current location of the mobile device within the indoor environment to the mobile device.

50. The apparatus of claim 49 wherein the processor is further configured to:
determine that the mobile device has entered the indoor environment; and
send the 3D representation to the mobile device responsive to determining that the mobile device has entered the indoor environment.

51. The apparatus of claim 49 wherein the processor is further configured to:
receive a request for the 3D representation of the current location of the mobile device from the mobile device.

52. The apparatus of claim 49 wherein the customization information includes transparency parameters, the transparency parameters defining levels of transparency to be associated with objects included in the 3D representation of the current location of the mobile device.

53. The apparatus of claim 49 wherein the customization information includes at least one of texture information and color information, the texture information identifying one or more textures to be applied to objects included in the 3D representation and the color information identifying one or more colors to be applied to the objects included in the 3D representation.

54. The apparatus of claim 49 wherein the customization information includes route information, the route information identifying a route through the indoor environment, and wherein the processor being configured to generate the 3D representation of the current location of the mobile device within the indoor environment based on the 3D model of the indoor environment is further configured to render second portions of the 3D representation of the current location of the mobile device as partially transparent to emphasize the route through the indoor environment.

55. A non-transitory computer-readable medium, having stored thereon computer-readable instructions for providing improved navigation information for an indoor environment to a mobile device, comprising instructions configured to cause a computer to:
access a two-dimensional (2D) map of the indoor environment;
access customization information comprising one or more attributes to be applied to a three-dimensional (3D) model of the indoor environment derived from the 2D map of the indoor environment, the customization information comprising a user profile associated with a user of the mobile device and security parameters associated with the indoor environment;
analyze the 2D map of the indoor environment to extract geometry information associated with a layout of the indoor environment;
generate the 3D model of the indoor environment based on the geometry extracted from the 2D map of the indoor environment and the customization information;
generate a 3D representation of a current location of the mobile device within the indoor environment based on the 3D model of the indoor environment, the instructions to cause the computer to generate the 3D representation of the current location of the mobile device within the indoor environment based on the 3D model of the indoor environment comprise instructions to cause the computer to selectively render portions of the 3D representation as opaque based on the user profile and the security parameters associated with the indoor environment; and
send the 3D representation of the current location of the mobile device within the indoor environment to the mobile device instead of sending the 3D model of the indoor environment.

56. The computer-readable medium of claim 55, further comprising instructions configured to cause the computer to:
determine that the mobile device has entered the indoor environment; and
send the 3D representation to the mobile device responsive to determining that the mobile device has entered the indoor environment.

57. The computer-readable medium of claim 55, further comprising instructions configured to cause the computer to:
receive a request for the 3D representation of the current location of the mobile device from the mobile device.

58. The computer-readable medium of claim 55 wherein the customization information includes transparency parameters, the transparency parameters defining levels of transparency to be associated with objects included in the 3D representation of the current location of the mobile device.

59. The computer-readable medium of claim 55 wherein the customization information includes at least one of texture information and color information, the texture information identifying one or more textures to be applied to objects included in the 3D representation and the color information identifying one or more colors to be applied to the objects included in the 3D representation.

60. The computer-readable medium of claim 55 wherein the customization information includes route information, the route information identifying a route through the indoor environment, and wherein the instructions configured to cause the computer to generate the 3D representation of the current location of the mobile device within the indoor environment based on the 3D model of the indoor environment comprise instructions configured to cause the computer to render second portions of the 3D representation of the current location of the mobile device as partially transparent to emphasize the route through the indoor environment.

61. A method for providing improved navigation through an indoor environment using a mobile device, the method comprising:
receiving, using the mobile device, a three-dimensional (3D) model of the indoor environment;
accessing, using the mobile device, customization information comprising one or more attributes to be applied to the 3D model of the indoor environment, the customization information comprising a user profile associated with a user of the mobile device and security parameters associated with the indoor environment;
applying, using the mobile device, the customization information to the 3D model of the indoor environment;
generating, using the mobile device, a 3D representation of a current location of the mobile device within the indoor environment based on the 3D model of the indoor environment, wherein generating the 3D representation comprises selectively rendering portions of the representation of the model as opaque based on the user profile and the security parameters associated with the indoor environment; and
displaying, using the mobile device, the 3D representation of the current location of the mobile device within the indoor environment on a display of the mobile device.

62. The method of claim 61 wherein displaying the 3D representation of the current location of the mobile device within the indoor environment on the display of the mobile device further comprises displaying a field of view in the 3D representation of the current location of the mobile device based at least in part on an orientation of the mobile device.

63. The method of claim 61 wherein the customization information includes transparency parameters, the transparency parameters defining levels of transparency to be associated with objects included in the 3D representation of the current location of the mobile device.

64. The method of claim 61 wherein the customization information includes at least one of texture information and color information, the texture information identifying one or more textures to be applied to objects included in the 3D representation and the color information identifying one or more colors to be applied to the objects included in the 3D representation.

65. The method of claim 61 wherein the customization information includes route information, the route information identifying a route through the indoor environment, and wherein generating the 3D representation of the current location of the mobile device within the indoor environment based on the 3D model of the indoor environment comprises rendering second portions of the 3D representation of the current location of the mobile device as partially transparent to emphasize the route through the indoor environment.

66. The method of claim 61 wherein the receiving the 3D model of the indoor environment comprises receiving the 3D model of the indoor environment from a navigation server.

67. An apparatus for providing improved navigation through an indoor environment using a mobile device, the apparatus comprising:
means for receiving a three-dimensional (3D) model of the indoor environment;
means for accessing customization information comprising one or more attributes to be applied to the 3D model of the indoor environment, the customization information comprising a user profile associated with a user of the mobile device and security parameters associated with the indoor environment;
means for applying the customization information to the 3D model of the indoor environment;
means for generating a 3D representation of a current location of the mobile device within the indoor environment based on the 3D model of the indoor environment, wherein the means for generating the 3D representation comprises means for selectively rendering portions of the representation of the model as opaque based on the user profile and the security parameters associated with the indoor environment; and
means for displaying the 3D representation of the current location of the mobile device within the indoor environment on a display of the mobile device.

68. The apparatus of claim 67 wherein the means for displaying the 3D representation of the current location of the mobile device within the indoor environment on the display of the mobile device further comprises means for displaying a field of view in the 3D representation of the current location of the mobile device based at least in part on an orientation of the mobile device.

69. The apparatus of claim 67 wherein the customization information includes transparency parameters, the transparency parameters defining levels of transparency to be associated with objects included in the 3D representation of the current location of the mobile device.

70. The apparatus of claim 67 wherein the customization information includes at least one of texture information and color information, the texture information identifying one or more textures to be applied to objects included in the 3D representation and the color information identifying one or more colors to be applied to the objects included in the 3D representation.

71. The apparatus of claim 67 wherein the customization information includes route information, the route information identifying a route through the indoor environment, and wherein the means for generating the 3D representation of the current location of the mobile device within the indoor environment based on the 3D model of the indoor environment comprises means for rendering second portions of the 3D representation of the current location of the mobile device as partially transparent to emphasize the route through the indoor environment.

72. The apparatus of claim 67 wherein the means for receiving the 3D model of the indoor environment comprises means for receiving the 3D model of the indoor environment from a navigation server.

73. A non-transitory computer-readable medium, having stored thereon computer-readable instructions for providing improved navigation through an indoor environment using a mobile device, comprising instructions configured to cause a computer to:

receive a three-dimensional (3D) model of the indoor environment;

access customization information comprising one or more attributes to be applied to the 3D model of the indoor environment, the customization information comprising a user profile associated with a user of the mobile device and security parameters associated with the indoor environment;

apply the customization information to the 3D model of the indoor environment;

generate a 3D representation of a current location of the mobile device within the indoor environment based on the 3D model of the indoor environment, the instructions to cause the computer to generate the 3D representation comprise instructions to cause the computer to selectively rendering portions of the representation of the model as opaque based on the user profile and the security parameters associated with the indoor environment; and display the 3D representation of the current location of the mobile device within the indoor environment on a display of the mobile device.

74. The non-transitory computer-readable medium of claim 73 wherein the instructions configured to cause the computer to display the 3D representation of the current location of the mobile device within the indoor environment on the display of the mobile device further comprise instructions configured to cause the computer to display a field of view in the 3D representation of the current location of the mobile device based at least in part on an orientation of the mobile device.

75. The non-transitory computer-readable medium of claim 73 wherein the customization information includes transparency parameters, the transparency parameters defining levels of transparency to be associated with objects included in the 3D representation of the current location of the mobile device.

76. The non-transitory computer-readable medium of claim 73 wherein the customization information includes at least one of texture information and color information, the texture information identifying one or more textures to be applied to objects included in the 3D representation and the color information identifying one or more colors to be applied to the objects included in the 3D representation.

77. The non-transitory computer-readable medium of claim 73 wherein the customization information includes route information, the route information identifying a route through the indoor environment, and wherein generating the 3D representation of the current location of the mobile device within the indoor environment based on the 3D model of the indoor environment comprises rendering second portions of the 3D representation of the current location of the mobile device as partially transparent to emphasize the route through the indoor environment.

78. The non-transitory computer-readable medium of claim 73 wherein the instructions configured to cause the computer to receive the 3D model of the indoor environment comprise instructions configured to cause the computer to receive the 3D model of the indoor environment from a navigation server.

79. An apparatus for providing improved navigation through an indoor environment using a mobile device, the apparatus comprising:

a transceiver configured to transmit and receive data wirelessly;

a memory configured to store processor-executable program code; and a processor configured to:

receive a three-dimensional (3D) model of the indoor environment;

access customization information comprising one or more attributes to be applied to the 3D model of the indoor environment, the customization information comprising a user profile associated with a user of the mobile device and security parameters associated with the indoor environment;

apply the customization information to the 3D model of the indoor environment;

generate a 3D representation of a current location of the mobile device within the indoor environment based on the 3D model of the indoor environment, wherein the processor is configured to selectively render portions of the 3D representation as opaque based on the user profile and the security parameters associated with the indoor environment; and display the 3D representation of the current location of the mobile device within the indoor environment on a display of the mobile device.

80. The apparatus of claim 79 wherein the processor being configured to display the 3D representation of the current location of the mobile device within the indoor environment on the display of the mobile device is further configured to display a field of view in the 3D representation of the current location of the mobile device based at least in part on an orientation of the mobile device.

81. The apparatus of claim 79 wherein the customization information includes transparency parameters, the transparency parameters defining levels of transparency to be associated with objects included in the 3D representation of the current location of the mobile device.

82. The apparatus of claim 79 wherein the customization information includes at least one of texture information and color information, the texture information identifying one or more textures to be applied to objects included in the 3D representation and the color information identifying one or more colors to be applied to the objects included in the 3D representation.

83. The apparatus of claim 79 wherein the customization information includes route information, the route information identifying a route through the indoor environment, and wherein generating the 3D representation of the current location of the mobile device within the indoor environment based on the 3D model of the indoor environment comprises rendering second portions of the 3D representation of the current location of the mobile device as partially transparent to emphasize the route through the indoor environment.

84. The apparatus of claim 79 wherein the processor being configured to receive the 3D model of the indoor environment is further configured to receive the 3D model of the indoor environment from a navigation server.

85. A method for providing improved navigation through an indoor environment using a mobile device, the method comprising:

sending, using the mobile device, a request to a navigation server for a three-dimensional (3D) representation of a current location of the mobile device;

sending, using the mobile device, customization information comprising one or more attributes to be applied to the 3D representation of the indoor environment by the navigation server, the customization information comprising a user profile associated with a user of the mobile device and security parameters associated with the indoor environment;

receiving, using the mobile device, the 3D representation of the current location of the mobile device within the indoor environment from the navigation server, the 3D representation comprising portions selectively rendered as opaque based on the user profile and the security parameters associated with the indoor environment; and displaying, using the mobile device, the 3D representation of the current location of the mobile device within the indoor environment on a display of the mobile device.

86. The method of claim 85 wherein the customization information includes transparency parameters, the transparency parameters defining levels of transparency to be associated with objects included in the 3D representation of the current location of the mobile device.

87. The method of claim 85 wherein the customization information includes at least one of texture information and color information, the texture information identifying one or more textures to be applied to objects included in the 3D representation and the color information identifying one or more colors to be applied to the objects included in the 3D representation.

88. An apparatus for providing improved navigation through an indoor environment using a mobile device, the apparatus comprising:

means for sending a request to a navigation server for a three-dimensional (3D) representation of a current location of the mobile device;

means for sending customization information comprising one or more attributes to be applied to the 3D representation of the indoor environment by the navigation server, the customization information comprising a user profile associated with a user of the mobile device and security parameters associated with the indoor environment;

means for receiving the 3D representation of the current location of the mobile device within the indoor environment from the navigation server, the 3D representation comprising portions selectively rendered as opaque based on the user profile and the security parameters associated with the indoor environment; and means for displaying the 3D representation of the current location of the mobile device within the indoor environment on a display of the mobile device.

89. The apparatus of claim 88 wherein the customization information includes transparency parameters, the transparency parameters defining levels of transparency to be associated with objects included in the 3D representation of the current location of the mobile device.

90. The apparatus of claim 88 wherein the customization information includes at least one of texture information and color information, the texture information identifying one or more textures to be applied to objects included in the 3D representation and the color information identifying one or more colors to be applied to the objects included in the 3D representation.

91. A non-transitory computer-readable medium, having stored thereon computer-readable instructions for providing improved navigation through an indoor environment using a mobile device, comprising instructions configured to cause a computer to:

send a request to a navigation server for a three-dimensional (3D) representation of a current location of the mobile device;

send customization information comprising one or more attributes to be applied to the 3D representation of the indoor environment by the navigation server, the customization information comprising a user profile associated with a user of the mobile device and security parameters associated with the indoor environment;

receive the 3D representation of the current location of the mobile device within the indoor environment from the navigation server, the 3D representation comprising portions selectively rendered as opaque based on the user profile and the security parameters associated with the indoor environment; and display the 3D representation of the current location of the mobile device within the indoor environment on a display of the mobile device.

92. The non-transitory computer-readable medium of claim 91 wherein the customization information includes transparency parameters, the transparency parameters defining levels of transparency to be associated with objects included in the 3D representation of the current location of the mobile device.

93. The non-transitory computer-readable medium of claim 91 wherein the customization information includes at least one of texture information and color information, the texture information identifying one or more textures to be applied to objects included in the 3D representation and the color information identifying one or more colors to be applied to the objects included in the 3D representation.

94. An apparatus for providing improved navigation through an indoor environment using a mobile device, the apparatus comprising:

a transceiver configured to transmit and receive data wirelessly;

a memory configured to store processor-executable program code; and a processor configured to:

send a request to a navigation server for a three-dimensional (3D) representation of a current location of the mobile device;

send customization information comprising one or more attributes to be applied to the 3D representation of the indoor environment by the navigation server, the customization information comprising a user profile associated with a user of the mobile device and security parameters associated with the indoor environment;

receive the 3D representation of the current location of the mobile device within the indoor environment from the navigation server, the 3D representation comprising portions selectively rendered as opaque based on the user profile and the security parameters associated with the indoor environment; and display the 3D representation of the current location of the mobile device within the indoor environment on a display of the mobile device.

95. The apparatus of claim 94 wherein the customization information includes transparency parameters, the transparency parameters defining levels of transparency to be associated with objects included in the 3D representation of the current location of the mobile device.

96. The apparatus of claim 94 wherein the customization information includes at least one of texture information and color information, the texture information identifying one or more textures to be applied to objects included in the 3D representation and the color information identifying one or more colors to be applied to the objects included in the 3D representation.

\* \* \* \* \*